US011630601B2

United States Patent
Yi et al.

(10) Patent No.: US 11,630,601 B2
(45) Date of Patent: Apr. 18, 2023

(54) MEMORY AND APPARATUS FOR PERFORMING ACCESS CONTROL WITH AID OF MULTI-PHASE MEMORY-MAPPED QUEUE

(71) Applicant: Silicon Motion, Inc., Hsinchu County (TW)

(72) Inventors: Cheng Yi, Vancouver (CA); Kaihong Wang, Colorado Springs, CO (US); Sheng-I Hsu, Hsinchu County (TW); I-Ling Tseng, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 51 days.

(21) Appl. No.: 17/515,570

(22) Filed: Nov. 1, 2021

(65) Prior Publication Data

US 2022/0283732 A1    Sep. 8, 2022

Related U.S. Application Data

(60) Provisional application No. 63/159,950, filed on Mar. 11, 2021, provisional application No. 63/155,307, filed on Mar. 2, 2021.

(51) Int. Cl.
*G06F 3/06* (2006.01)

(52) U.S. Cl.
CPC .......... *G06F 3/0655* (2013.01); *G06F 3/0622* (2013.01); *G06F 3/0679* (2013.01)

(58) Field of Classification Search
None
See application file for complete search history.

(56) References Cited

U.S. PATENT DOCUMENTS

| | | | |
|---|---|---|---|
| 8,271,700 B1 * | 9/2012 | Annem | G06F 13/28 |
| | | | 710/22 |
| 10,198,299 B1 * | 2/2019 | Xu | G06F 13/28 |
| 2010/0262979 A1 | 10/2010 | Borchers | |
| 2014/0195480 A1 | 7/2014 | Talagala | |
| 2015/0012687 A1 | 1/2015 | Huang | |

(Continued)

FOREIGN PATENT DOCUMENTS

TW    202031021 A    8/2020

*Primary Examiner* — Edward J Dudek, Jr.
*Assistant Examiner* — Ralph A Verderamo, III
(74) *Attorney, Agent, or Firm* — Winston Hsu

(57) ABSTRACT

A method and apparatus for performing access control of a memory device with aid of a multi-phase memory-mapped queue are provided. The method includes: receiving a first host command from a host device; and in response to the first host command, utilizing a processing circuit within the controller to send a first operation command to the NV memory through a control logic circuit of the controller, and trigger a first set of secondary processing circuits within the controller to operate and interact via the multi-phase memory-mapped queue, for accessing the first data for the host device, wherein the processing circuit and the first set of secondary processing circuits share the multi-phase memory-mapped queue, and use the multi-phase memory-mapped queue as multiple chained message queues associated with multiple phases, respectively, for performing message queuing for a chained processing architecture including the processing circuit and the first set of secondary processing circuits.

13 Claims, 17 Drawing Sheets

(56) References Cited

U.S. PATENT DOCUMENTS

| | | | |
|---|---|---|---|
| 2020/0174819 A1* | 6/2020 | Dong | G06F 13/1668 |
| 2020/0326890 A1* | 10/2020 | Benisty | G06F 3/0673 |
| 2021/0026713 A1* | 1/2021 | Puttaswamy | G06F 3/0673 |
| 2021/0149599 A1* | 5/2021 | Kajihara | G06F 12/0871 |

* cited by examiner

MEMORY AND APPARATUS FOR PERFORMING ACCESS CONTROL WITH AID OF MULTI-PHASE MEMORY-MAPPED QUEUE

CROSS REFERENCE TO RELATED APPLICATIONS

This application claims the benefit of U.S. Provisional Application No. 63/155,307, which was filed on Mar. 2, 2021, and is included herein by reference. In addition, this application claims the benefit of U.S. Provisional Application No. 63/159,950, which was filed on Mar. 11, 2021, and is included herein by reference.

BACKGROUND OF THE INVENTION

1. Field of the Invention

The present invention is related to memory control, and more particularly, to a method for performing access control of a memory device with aid of a multi-phase memory-mapped queue, and associated apparatus such as the memory device, a memory controller thereof, a system-on-chip (SoC) integrated circuit (IC), etc.

2. Description of the Prior Art

Developments in memory technology have enabled the wide application of various portable or non-portable memory devices, such as memory cards respectively conforming to the SD/MMC, CF, MS and XD specifications, and embedded memory devices respectively conforming to the UFS and eMMC specifications. Improving access control of these memory devices remains an issue to be solved in the art.

NAND flash memories may comprise single level cell (SLC) and multiple level cell (MLC) flash memories. In an SLC flash memory, each transistor used as a memory cell may store either of two electrical charge values respectively corresponding to logic values 0 and 1. In comparison, the storage ability of each transistor used as a memory cell in an MLC flash memory may be fully utilized. The transistor in the MLC flash memory can be driven by a voltage higher than that in the SLC flash memory, and different voltage levels can be utilized to record information of at least two bits (e.g. 00, 01, 11, or 10). In theory, the recording density of the MLC flash memory may reach at least twice the recording density of the SLC flash memory, and is therefore preferred by manufacturers of NAND flash memories.

The lower cost and larger capacity of the MLC flash memory means it is more likely to be applied in memory devices than an SLC flash memory. The MLC flash memory does have instability issues, however. To ensure that access control of the flash memory in the memory device meets required specifications, a controller of the flash memory may be equipped with some management mechanisms for properly managing data access.

Even memory devices with the above management mechanisms may have certain deficiencies, however. For example, a plurality of functional blocks within the hardware architecture, such as hardware engines, may be implemented for performing predetermined processing operations. As the number of hardware engines may increase to achieve more reliable results, the number of message queues may increase correspondingly. As a result, the hardware architecture may become very complicated, causing the associated costs to be increased. One or more other solutions may be proposed to try preventing the problems above, but additional problems such as some side effects may be introduced.

Thus, there is a need for a novel method and associated architecture to solve the problems of the related art without introducing any side effect or in a way that is less likely to introduce side effects.

SUMMARY OF THE INVENTION

An objective of the present invention is to provide a method for performing access control of a memory device with aid of a multi-phase memory-mapped queue, and to provide associated apparatus such as the memory device, a controller thereof, a system-on-chip (SoC) integrated circuit (IC), etc., to solve the problems mentioned above.

At least one embodiment of the present invention provides a method for performing access control of a memory device with aid of a multi-phase memory-mapped queue, wherein the method is applied to a controller of the memory device. The memory device may comprise the controller and a non-volatile (NV) memory, and the NV memory may comprise at least one NV memory element (e.g. one or more NV memory elements). The method may comprise: receiving a first host command from a host device, wherein the first host command indicates accessing first data at a first logical address; and in response to the first host command, utilizing a processing circuit within the controller to send a first operation command to the NV memory through a control logic circuit of the controller, and trigger a first set of secondary processing circuits within the controller to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

In addition to the method mentioned above, the present invention also provides a memory device, and the memory device comprises an NV memory and a controller. The NV memory is configured to store information, wherein the NV memory may comprise at least one NV memory element (e.g. one or more NV memory elements). The controller is coupled to the NV memory, and the controller is configured to control operations of the memory device. In addition, the controller comprises a processing circuit, wherein the processing circuit is configured to control the controller according to a plurality of host commands from a host device, to allow the host device to access the NV memory through the controller. The controller further comprises a plurality of secondary processing circuits that are configured to operate as a plurality of hardware engines, and comprises a multi-phase memory-mapped queue that is coupled to the processing circuit and the plurality of secondary processing circuits, where the multi-phase memory-mapped queue is configured to perform message queuing for the processing circuit and the plurality of secondary processing circuits. For example, the controller receives a first host command from the host device, wherein the first host command indicates accessing first data at a first logical address, and the first host command is one of the plurality of host commands; and in response to the first host command, the controller utilizes the processing circuit to send a first operation command to the NV memory through a control logic circuit of the controller, and trigger a first set of secondary processing circuits among the plurality of secondary processing circuits to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

In addition to the method mentioned above, the present invention also provides a controller of a memory device, wherein the memory device comprises the controller and an NV memory. The NV memory may comprise at least one NV memory element (e.g. one or more NV memory elements). In addition, the controller comprises a processing circuit, wherein the processing circuit is configured to control the controller according to a plurality of host commands from a host device, to allow the host device to access the NV memory through the controller. The controller further comprises a plurality of secondary processing circuits that are configured to operate as a plurality of hardware engines, and comprises a multi-phase memory-mapped queue that is coupled to the processing circuit and the plurality of secondary processing circuits, where the multi-phase memory-mapped queue is configured to perform message queuing for the processing circuit and the plurality of secondary processing circuits. For example, the controller receives a first host command from the host device, wherein the first host command indicates accessing first data at a first logical address, and the first host command is one of the plurality of host commands; and in response to the first host command, the controller utilizes the processing circuit to send a first operation command to the NV memory through a control logic circuit of the controller, and trigger a first set of secondary processing circuits among the plurality of secondary processing circuits to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

The method and the associated apparatus provided by the present invention can ensure that the memory device can properly operate under various situations, where examples of the apparatus mentioned above comprise: the controller, the memory device, etc. In addition, the method and the associated apparatus provided by the present invention can solve the problems of the related art without introducing any side effect or in a way that is less likely to introduce side effects. As a result, the associated costs can be reduced. Additionally, with aid of the multi-phase memory-mapped queue, the method and the associated apparatus provided by the present invention can ensure real-time response from the memory device to the host device, and therefore can enhance the overall performance.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
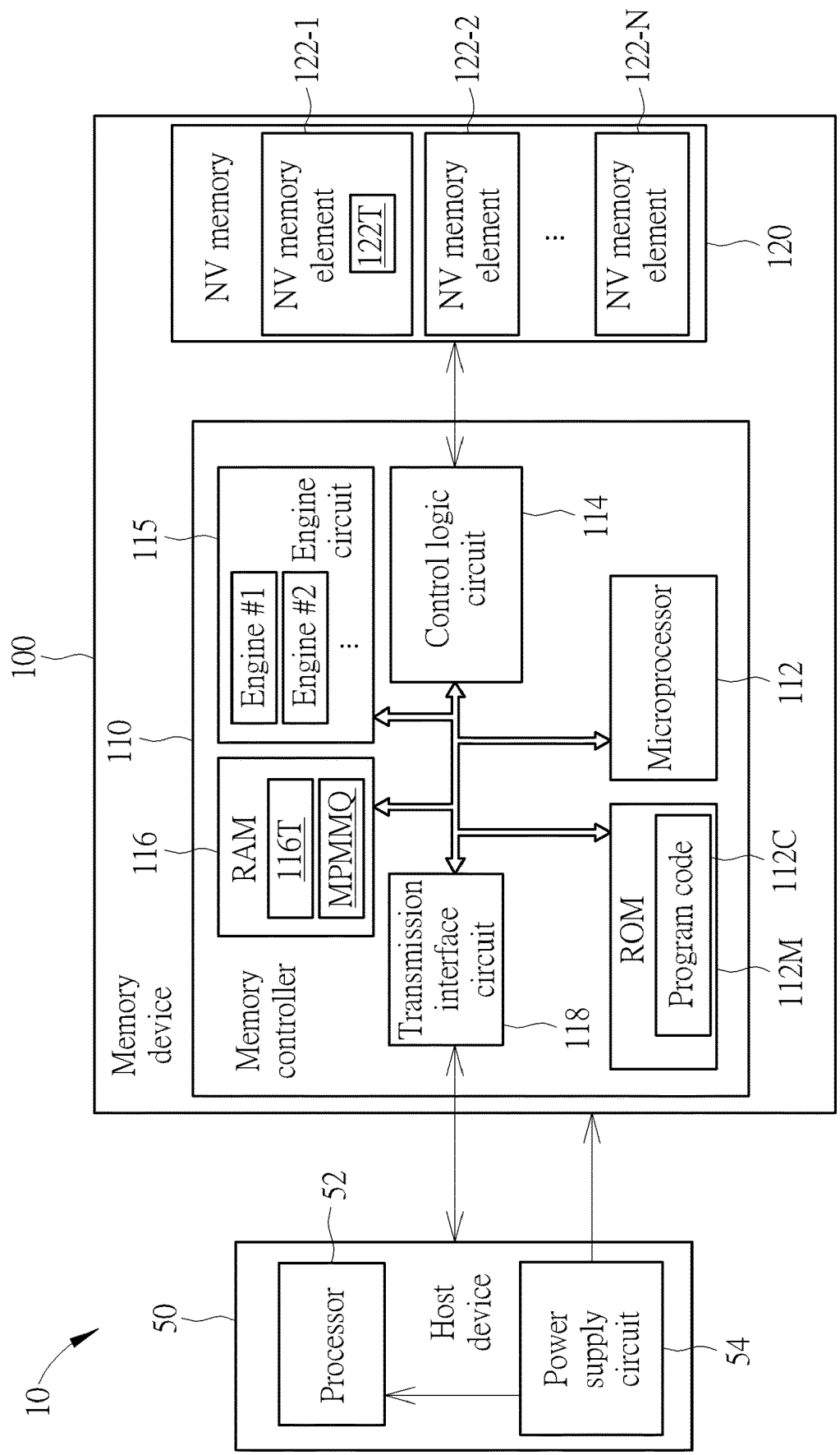
FIG. 1 is a diagram of an electronic device according to an embodiment of the present invention.

Embodiments of the present invention provide a method and associated apparatus for performing access control of a memory device with aid of a multi-phase memory-mapped queue such as a multi-phase memory-mapped message queue. The apparatus may represent any application-specific integrated circuit (ASIC) product in which the multi-phase memory-mapped queue such as messaging mechanism between one or more processors/processor cores and multiple hardware engines are implemented, but the present invention is not limited thereto. The apparatus may comprise at least a portion (e.g. a part or all) of an electronic device equipped with an integrated circuit (IC) in which the multi-phase memory-mapped queue is implemented. For example, the apparatus may comprise a portion of the electronic device, such as the memory device, a controller thereof, etc. For another example, the apparatus may comprise the whole of the electronic device. For yet another example, the apparatus may comprise a system-on-chip (SoC) IC such as that comprising the controller. In addition, some control schemes of the present invention provide the following features:

(1) the multi-phase memory-mapped queue may comprise multiple chained message queues implemented within a single memory-mapped ring buffer, where each chained message queue of the multiple chained message queues is associated with a phase among multiple phases respectively corresponding to the multiple chained message queues, and the multi-phase memory-mapped queue is transparent to each processor or engine for en-queuing or de-queuing operations;

(2) the architecture of the multi-phase memory-mapped queue may vary, for example, the present invention method and apparatus can change one or more message flows of the multi-phase memory-mapped queue by splitting and merging message flows in any given phase;

(3) the multi-phase memory-mapped queue can be set up with a flexible multi-memory domain access attributes configuration, for example, regarding each of various data structures that need to implement a memory-mapped queue, the present invention method and apparatus can dynamically configure memory access attributes associated with memory domains, such as doorbell, queue entry, queue body, and data buffer, where the memory domain access attributes can be configured either on per queue base or on per message base; and (4) regarding memory-mapped queue distribution, the present invention method and apparatus can configure any incoming queue or outgoing queue in an engine as chained or non-chained queues, where a request message queue may produce multiple chained messages and multiple completion messages to multiple chained outgoing queues and multiple completion outgoing queues;

where one or more of the above features may be combined, but the present invention is not limited thereto. By using the multi-phase memory-mapped queue, the present invention method and associated apparatus can solve the related art problems without introducing any side effect or in a way that is less likely to introduce side effects.

FIG. 1 is a diagram of an electronic device 10 according to an embodiment of the present invention, where the electronic device 10 may comprise a host device 50 and a memory device 100. The host device 50 may comprise at least one processor (e.g. one or more processors), which may be collectively referred to as the processor 52, and the host device 50 may further comprise a power supply circuit 54, coupled to the processor 52. The processor 52 is arranged to control operations of the host device 50, and the power supply circuit 54 is arranged to provide power to the processor 52 and the memory device 100, and output one or more driving voltages to the memory device 100. The memory device 100 can be arranged to provide the host device 50 with storage space, and the one or more driving voltages can be obtained from the host device 50 to be used as the power source of the memory device 100. Examples of the host device 50 may comprise (but are not limited to) multifunctional mobile phone, wearable device, tablet, and personal computer such as desktop computer and laptop computer. Examples of the memory device 100 may comprise (but are not limited to) portable memory devices (e.g. memory cards conforming to SD/MMC, CF, MS, or XD specification), solid state drives (SSD), and various embedded memory devices respectively conforming to UFS and EMMC specification. According to the embodiment, the memory device 100 may comprise a controller such as a memory controller 110, and may further comprise a non-volatile (NV) memory 120, where the controller is arranged to control operations of the memory device 100 and access the NV memory 120, and the NV memory 120 is arranged to store information. The NV memory 120 may comprise at least one NV memory element (e.g. one or more NV memory elements) such as a plurality of NV memory elements 122-1, 122-2, . . . and 122-N, where the symbol "N" can represent a positive integer greater than one. For example, the NV memory 120 may be a flash memory, and the plurality of NV memory elements 122-1, 122-2, . . . and 122-N may be a plurality of flash memory chips or a plurality of flash memory dies, but the present invention is not limited thereto. In addition, the electronic device 10, the memory device 100 and the controller such as the memory controller 110 in the architecture shown in FIG. 1 can be taken as examples of the electronic device equipped with the IC, the memory device and the controller thereof as mentioned above, respectively.

As shown in FIG. 1, the memory controller 110 may comprise a processing circuit such as a microprocessor 112, a storage unit such as a read-only memory (ROM) 112M, a control logic circuit 114, an engine circuit 115 (e.g. a digital signal processing (DSP) engine), a random access memory (RAM) 116, and a transmission interface circuit 118, where the above elements can be coupled to each other through a bus. The engine circuit 115 may comprise multiple secondary processing circuits, and the multiple secondary processing circuits can be hardware functional blocks, which can be referred to as hardware engines. The hardware engines such as engines #1, #2, etc. may comprise a direct memory access (DMA) engine, a compression engine, a de-compression engine, an encoding engine (e.g. an encoder), a decoding engine (e.g. a decoder), a randomizing engine (e.g. a randomizer) and a de-randomizing engine (e.g. a de-randomizer), but the present invention is not limited thereto. For example, the encoding engine (e.g. the encoder) and the decoding engine (e.g. the decoder) can be integrated into a same module such as an encoding and decoding engine, the randomizing engine (e.g. the randomizer) and the de-randomizing engine (e.g. the de-randomizer) can be integrated into a same module such as a randomizing and de-randomizing engine, and/or the compression engine and the de-compression engine can be integrated into a same module such as a compression and de-compression engine. According to some embodiments, one or more sub-circuits of the engine circuit 115 may be integrated into the control logic circuit 114.

In the engine circuit 115, a data protection circuit comprising the encoding engine (e.g. the encoder) and the decoding engine (e.g. the decoder) can be arranged to protect data and/or perform error correction, and more particularly, can be arranged to perform encoding and decoding operations, respectively, and the randomizing engine (e.g. the randomizer) and the de-randomizing engine (e.g. the de-randomizer) can be arranged to perform randomizing and de-randomizing operations, respectively. In addition, the compression engine and the de-compression engine can be arranged to perform compression and de-compression operations, respectively. Additionally, the DMA engine can be arranged to perform DMA operations. For example, during data writing as requested by the host device 50, the DMA engine can perform the DMA operations on a first host-side memory region of a certain memory in the host device 50 through the transmission interface circuit 118, in order to receive data from the first host-side memory region through the transmission interface circuit 118. For another example, during data reading as requested by the host device 50, the DMA engine can perform the DMA operations on a second host-side memory region (which may be the same as or different from the first host-side memory region) of the memory in the host device 50 through the transmission interface circuit 118, in order to transmit (e.g. return) data to the second host-side memory region through the transmission interface circuit 118.

The RAM 116 is implemented by a static random access memory (SRAM), but the present invention is not limited thereto. The RAM 116 can be arranged to provide the memory controller 110 with internal storage space. For example, the RAM 116 can be used as a buffer memory to buffer data. More particularly, the RAM 116 may comprise a memory region (e.g. a predetermined memory region) that is used as a multi-phase memory-mapped queue MPMMQ, which can be taken as an example of the multi-phase memory-mapped queue mentioned above, but the present invention is not limited thereto. For example, the multi-phase memory-mapped queue MPMMQ can be implemented in another memory within the memory controller 110. In addition, the ROM 112M of the embodiment is arranged to store a program code 112C, and the microprocessor 112 is arranged to execute the program code 112C to control access to the NV memory 120. Please note that, in some examples, the program code 112C can be stored in the RAM 116 or any form of memory. In addition, the transmission interface circuit 118 can conform to a specific communication specification such as Serial Advanced Technology Attachment (SATA) specification, Universal Serial Bus (USB) specification, Peripheral Component Interconnect Express (PCIe) specification, embedded Multi-Media Card (eMMC) specification, or Universal Flash Storage (UFS) specification), and can perform communication according to the specific communication specification.

In the embodiment, the host device 50 can access the memory device 100 by sending host commands and corresponding logical addresses to the memory controller 110. The memory controller 110 receives the host commands and the logical addresses, and translates the host commands into memory operation commands (which may be simply called operation commands), and controls the NV memory with the operation commands to perform reading, writing/programming, etc. on memory units (e.g. data pages) with physical addresses in the NV memory 120, where the physical addresses can be associated with the logical addresses. When the memory controller 110 performs an erase operation on any NV memory element 122-$n$ among the plurality of NV memory elements 122-1, 122-2, . . . and 122-N (the symbol "n" can represent any integer in the interval [1, N]), at least one of multiple blocks of the NV memory device 122-$n$ will be erased, where each block in the multiple blocks can comprise multiple pages (e.g. data pages), and an access operation (e.g. reading or writing) can be performed on one or more pages.

Some implementation details regarding the internal control of the memory device 100 can be further described as follows. According to some embodiments, the processing circuit such as the microprocessor 112 can control the memory controller 110 according to a plurality of host commands from the host device 50, to allow the host device 50 to access the NV memory 120 through the memory controller 110. The memory controller 110 can store data into the NV memory 120 for the host device 50, read the stored data in response to a host command from the host device 50 (e.g. one of the plurality of host commands), and provide the host device 50 with the data read from the NV memory 120. In the NV memory 120 such as the flash memory, the aforementioned at least one NV memory element (e.g. the plurality of NV memory elements 122-1, 122-2, . . . and 122-N) may comprise a plurality of blocks such as a first set of physical blocks in the NV memory element 122-1, a second set of physical blocks in the NV memory element 122-2, . . . and an Nth set of physical blocks in the NV memory element 122-N. The memory controller 110 can be designed to properly manage the plurality of blocks such as these sets of physical blocks.

The memory controller 110 can record, maintain, and/or update block management information regarding the block management in at least one table such as at least one temporary table (e.g. one or more temporary tables) in the RAM 116 and at least one non-temporary table (e.g. one or more non-temporary tables) in the NV memory 120, where the aforementioned at least one temporary table can be collectively referred to as the temporary table 116T, and the aforementioned at least one non-temporary table can be collectively referred to as the non-temporary table 122T. The temporary table 116T may comprise a temporary version of at least a portion (e.g. a part or all) of the non-temporary table 122T. For example, the non-temporary table 122T may comprise at least one logical-to-physical (L2P) address mapping table (e.g. one or more L2P address mapping tables), for recording mapping relationships between multiple logical addresses (e.g. logical block addresses (LBAs) indicating multiple logical blocks, and logical page addresses (LPAs) indicating multiple logical pages within any of the multiple logical blocks) and multiple physical addresses (e.g. physical block addresses (PBAs) indicating multiple physical blocks, and physical page addresses (PPAs) indicating multiple physical pages within any of the multiple physical blocks), and the temporary table 116T may comprise a temporary version of at least one sub-table (e.g. one or more sub-tables) of the at least one L2P address mapping table, where the memory controller 110 (e.g. the microprocessor 112) can perform bi-directional address translation between the host-side storage space (e.g. the logical addresses) of the host device 50 and the device-side storage space (e.g. the physical addresses) of the NV memory 120 within the memory device 100, in order to access data for the host device 50. For better comprehension, the non-temporary table 122T can be illustrated in the NV memory elements 122-1, but the present invention is not limited thereto. For example, the non-temporary table 122T can be stored in one or more NV memory elements among the plurality of NV memory elements 122-1, 122-2, . . . and 122-N. Additionally, when there is a need, the memory controller 110 can back up the temporary table 116T to the non-temporary table 122T in the NV memory 120 (e.g. one or more NV memory elements among the plurality of NV memory elements 122-1, 122-2, . . . and 122-N), and the memory controller 110 may load at least a portion (e.g. a part or all) of the non-temporary table 122T into the RAM 116 to become the temporary table 116T for quick reference.

Figure 2:
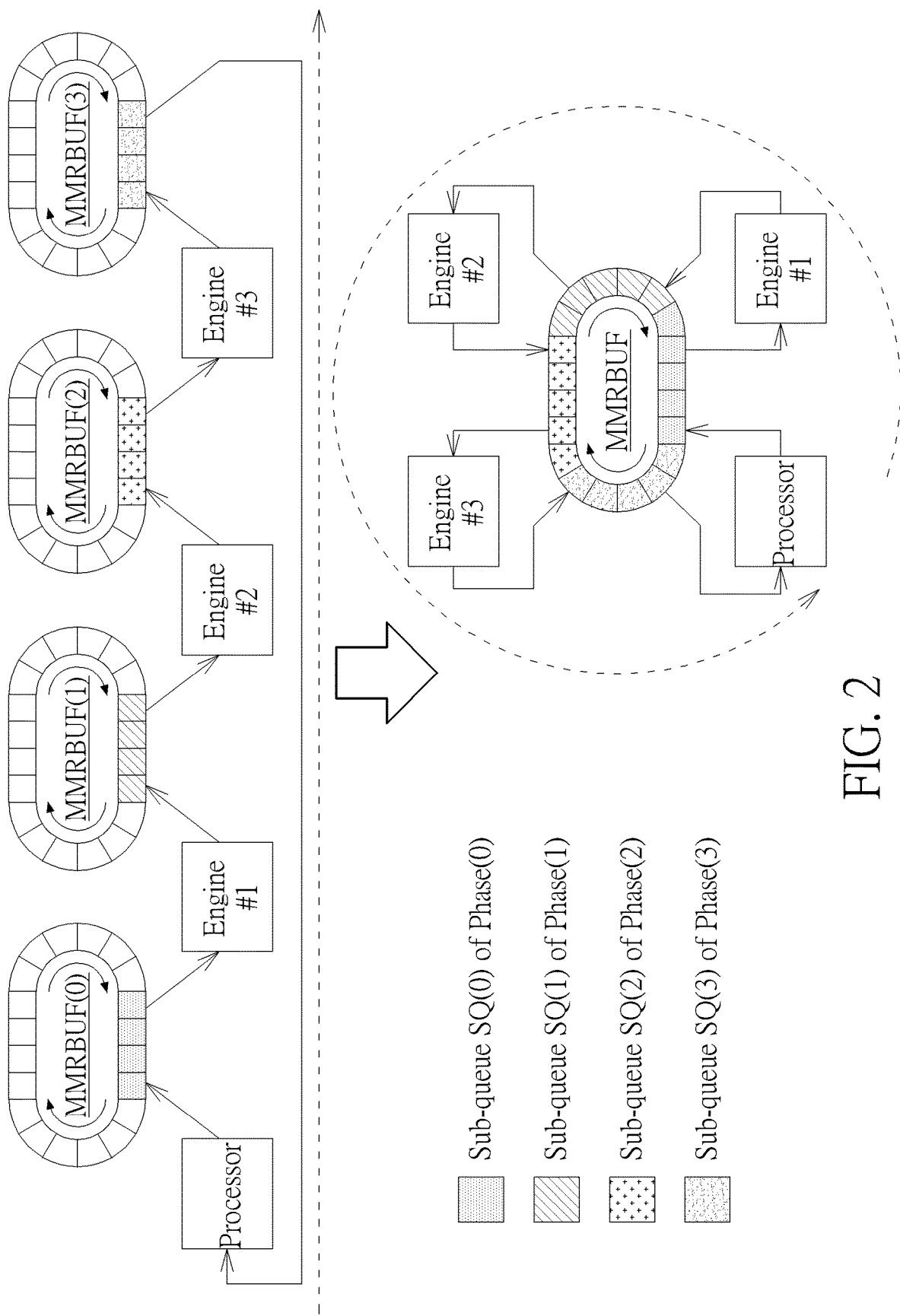
FIG. 2 illustrates, in the lower half thereof, a multi-phase queue control scheme of a method for performing access control of a memory device such as that shown in FIG. 1 with aid of a multi-phase memory-mapped queue according to an embodiment of the present invention, where a single phase queue control scheme can be illustrated as shown in the upper half of FIG. 2 for better comprehension.

FIG. 2 illustrates, in the lower half thereof, a multi-phase queue control scheme of the method for performing access control of the memory device such as that shown in FIG. 1 with aid of the multi-phase memory-mapped queue according to an embodiment of the present invention, where a single phase queue control scheme can be illustrated as shown in the upper half of FIG. 2 for better comprehension. The method can be applied to the architecture shown in FIG. 1, for example, the electronic device 10, the memory device 100, the memory controller 110, and the microprocessor 112 as well as the engine circuit 115 and the multi-phase memory-mapped queue MPMMQ. The multi-phase memory-mapped queue MPMMQ within the memory controller 110 can be implemented by way of a memory-mapped ring buffer MMRBUF, where the memory-mapped ring buffer MMRBUF can be positioned within the RAM 116, but the present invention is not limited thereto.

As shown in the upper half of FIG. 2, a message chain can be implemented with a processor, multiple engines and multiple memory-mapped ring buffers, and for the case that the memory-mapped ring buffer count of the multiple memory-mapped ring buffers is equal to four, the multiple memory-mapped ring buffers may comprise four memory-mapped ring buffers MMRBUF(0), MMRBUF(1), MMRBUF(2) and MMRBUF(3), where each of the memory-mapped ring buffers MMRBUF(0), MMRBUF(1), MMRBUF(2) and MMRBUF(3) can be regarded as a single-phase memory-mapped ring buffer. When the engine count increases, the memory-mapped ring buffer count may increase correspondingly. Thus, in a situation where the engine count is greater than one hundred, the memory-mapped ring buffer count is also greater than one hundred, which may cause the associated costs to be increased.

As shown in the lower half of FIG. 2, the present invention method and apparatus can utilize a single memory-mapped ring buffer such as the memory-mapped ring buffer MMRBUF to replace the multiple memory-mapped ring buffers such as the memory-mapped ring buffers MMRBUF(0), MMRBUF(1), etc., where the memory-mapped ring buffer MMRBUF can be regarded as a multi-phase memory-mapped ring buffer. The memory-mapped ring buffer MMRBUF may comprise multiple sub-queues {SQ(x)} respectively corresponding to multiple phases {Phase(x)}, such as the sub-queues SQ(0), SQ(1), SQ(2) and SQ(3) respectively corresponding to the phases Phase(0), Phase(1), Phase(2) and Phase(3) (respectively labeled "Sub-queue SQ(0) of Phase(0)", "Sub-queue SQ(1) of Phase(1)", "Sub-queue SQ(2) of Phase(2)" and "Sub-queue SQ(3) of Phase(3)" for brevity). Please note that the symbol "x" may represent any non-negative integer falling within an interval [0, (X−1)], and the symbol "X" may represent the sub-queue count of the multiple sub-queues {SQ(x)}. When the engine count increases, the sub-queue count X may increase correspondingly, but the memory-mapped ring buffer count can be very small, and more particularly, can be equal to one. Thus, in a situation where the engine count is greater than one hundred, the memory-mapped ring buffer count is very limited, and therefore the associated costs can be saved.

Although partial buffers of the memory-mapped ring buffers MMRBUF(0), MMRBUF(1), MMRBUF(2) and MMRBUF(3) may be illustrated with the same or similar shading patterns as that used for illustrating the sub-queues SQ(0), SQ(1), SQ(2) and SQ(3), respectively, for indicating the locations where the messages output from the processor and the engines are stored, the partial buffers of the memory-mapped ring buffers MMRBUF(0), MMRBUF(1), MMRBUF(2) and MMRBUF(3) are not equivalent to the sub-queues SQ(0), SQ(1), SQ(2) and SQ(3). Please note that in the single phase queue control scheme shown in the upper half of FIG. 2, the whole of each of the memory-mapped ring buffers MMRBUF(0), MMRBUF(1), MMRBUF(2) and MMRBUF(3) always exists. In addition, the memory-mapped ring buffers MMRBUF(0), MMRBUF(1), MMRBUF(2) and MMRBUF(3) operate independently. For example, an operation of one of the memory-mapped ring buffers MMRBUF(0), MMRBUF(1), MMRBUF(2) and MMRBUF(3) will not affect an operation of another of the memory-mapped ring buffers MMRBUF(0), MMRBUF(1), MMRBUF(2) and MMRBUF(3).

The processor and the engines #1, #2, etc. in the multi-phase queue control scheme may represent the processing circuit such as the microprocessor 112 and the secondary processing circuits such as the hardware engines (or the engines #1, #2, etc.) in the architecture shown in FIG. 1, respectively, but the present invention is not limited thereto. According to some embodiments, the processor and the engines #1, #2, etc. in the multi-phase queue control scheme can be replaced by any combination among various combinations of one or more processors/processor cores and/or hardware engines, such as a combination of one processor core and multiple hardware engines, a combination of multiple processor cores and multiple hardware engines, a combination of multiple processor cores, a combination of multiple hardware engines, etc.

Some implementation details regarding the design rules of the multi-phase memory-mapped queue MPMMQ (e.g. the memory-mapped ring buffer MMRBUF) can be described as follows. According to some embodiments, for the processor or any engine of the engines #1, #2, etc. in the multi-phase queue control scheme, the associated outgoing queue (e.g. one of the multiple sub-queues {SQ(x)}) will never overflow. This is guaranteed since an entry is en-queued to (e.g. input into) the outgoing queue only if there is at least one entry that is de-queued from (e.g. output from) an incoming queue in advance. That is, the processor or the any engine can operate according to the following rules:

(1) an outgoing queue tail (OQT) of the processor or the any engine shall never be passing over an incoming queue head (IQH) of the processor or the any engine; and
(2) the IQH IQH(x) shall never be passing over the OQT OQT(x−1) of an upstream processor or engine.

Regarding the former of the above two rules: if x>0, the OQT OQT(x) of the engine #x shall never be passing over the IQH IQH(x) of the engine #x; otherwise, when x=0, the OQT OQT(0) of the processor shall never be passing over the IQH IQH(0) of the processor. More particularly, the processor or the any engine can directly compare local OQT and IQH, such as the OQT OQT(x) and the IQH IQH(x). In addition, regarding the latter of the above two rules: if x>1, the IQT IQH(x) of the engine #x shall never be passing over the OQT OQT(x−1) of the upstream engine #(x−1); if x=1, the IQT IQH(1) of the engine #1 shall never be passing over the OQT OQT(0) of the upstream processor; otherwise, when x=0, the IQT IQH(0) of the processor shall never be passing over the OQT OQT(X−1) of the upstream engine #(X−1). More particularly, the processor or the any engine can operate according to any of the embodiments respectively shown in FIGS. 3-5. In the subsequent embodiments, the IQH IQH(x) such as the IQHs IQH(0), IQH(1), etc. and the OQT OQT(x) such as the OQTs OQT(0), OQT(1), etc. can be respectively written as the IQH IQHx such as the IQHs IQH0, IQH1, etc. and the OQT OQTx such as the OQTs OQT0, OQT1, etc. for brevity.

Figure 3:
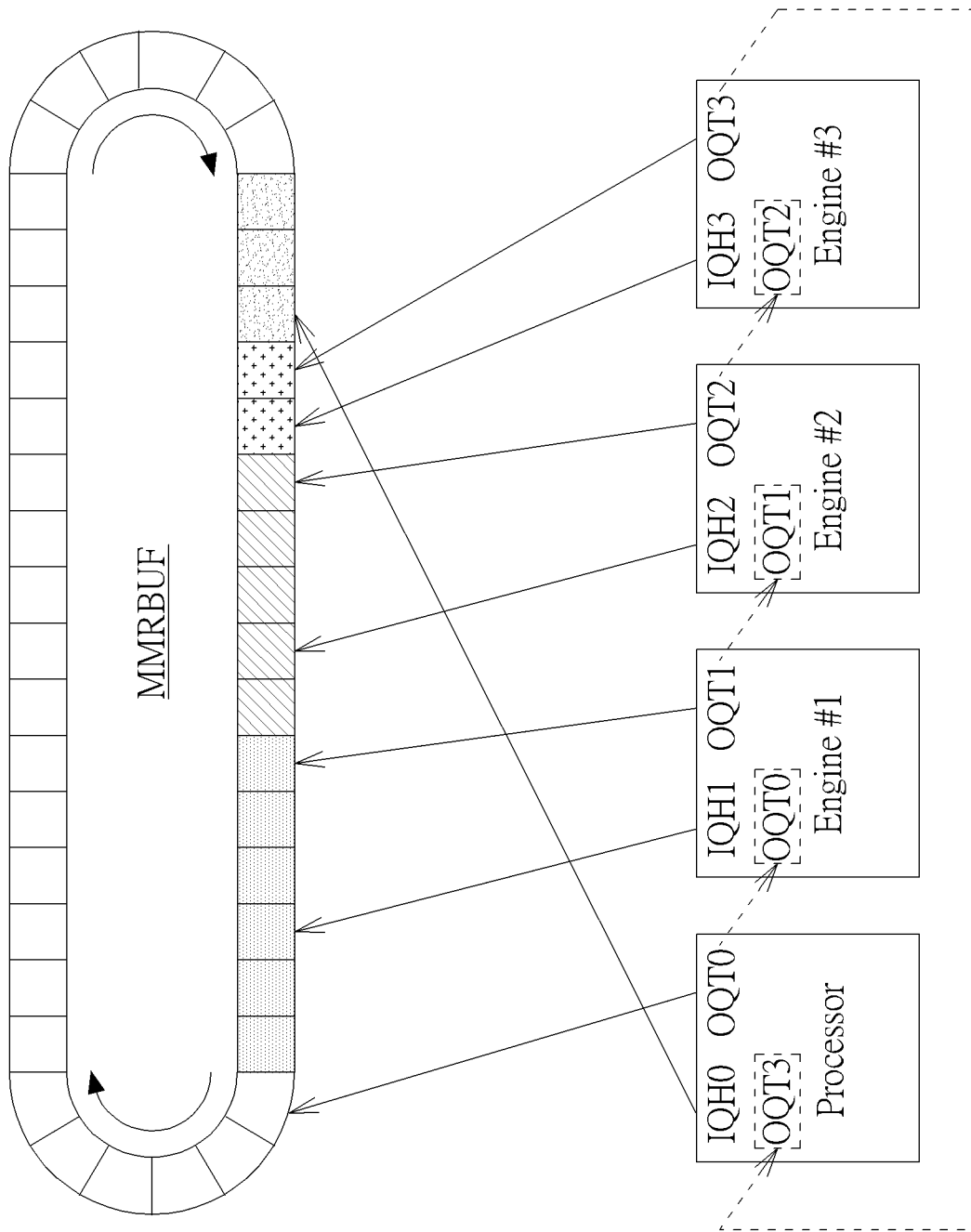
FIG. 3 illustrates an outgoing queue tail (OQT) remote update control scheme of the method according to an embodiment of the present invention.

FIG. 3 illustrates an OQT remote update control scheme of the method according to an embodiment of the present invention. The processor or the any engine can write the OQT to the downstream engine in the chain remotely, and the downstream engine in the chained architecture can compare the remote updated OQT (e.g. the OQT written by the processor or the any engine) as the incoming queue tail with the local IQH of the downstream engine. For example:

(1) the processor can write the OQT OQT0 to the downstream engine #1 in the chain remotely, and the downstream engine #1 in the chained architecture can compare the remote updated OQT OQT0 as the incoming queue tail with the local IQH IQH1 of the downstream engine #1;
(2) the engine #1 can write the OQT1 to the downstream engine #2 in the chain remotely, and the downstream engine #2 in the chained architecture can compare the remote updated OQT OQT1 as the incoming queue tail with the local IQH IQH2 of the downstream engine #2;
(3) the engine #2 can write the OQT2 to the downstream engine #3 in the chain remotely, and the downstream engine #3 in the chained architecture can compare the remote updated OQT OQT2 as the incoming queue tail with the local IQH IQH3 of the downstream engine #3; and
(4) the engine #3 can write the OQT3 to the downstream processor in the chain remotely, and the downstream processor in the chained architecture can compare the remote updated OQT OQT3 as the incoming queue tail with the local IQH IQH0 of the downstream processor;

but the present invention is not limited thereto. For brevity, similar descriptions for this embodiment are not repeated in detail here.

Figure 4:
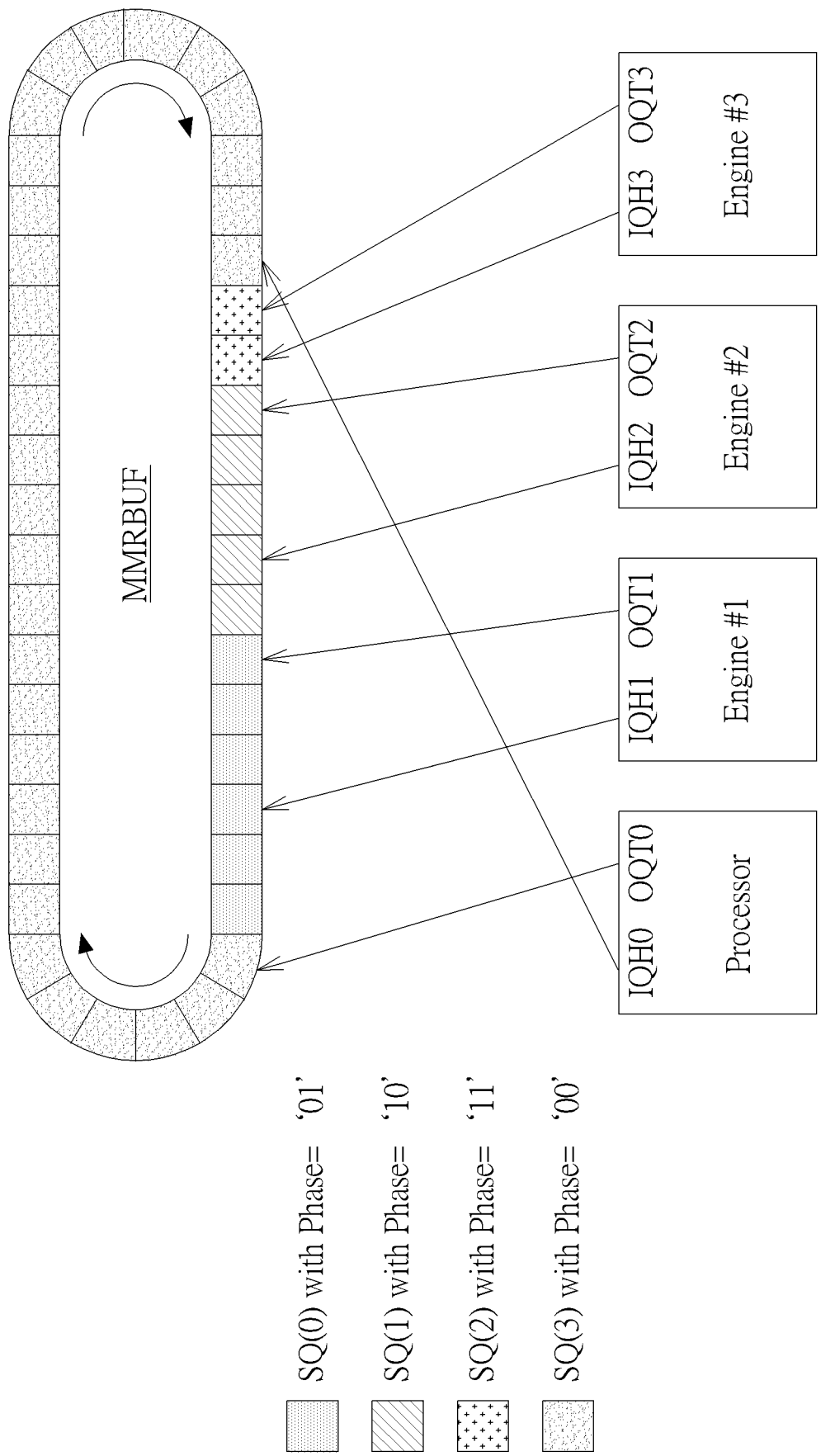
FIG. 4 illustrates a phase check control scheme of the method according to an embodiment of the present invention.

FIG. 4 illustrates a phase check control scheme of the method according to an embodiment of the present invention. For each outgoing message sent into the outgoing queue in the chain, there is a phase field, and a unique phase field value is associated with each processor or engine. More particularly, the processor or the any engine can read the incoming queue entries from the upstream engine in the chain until the phase field value changes, where the read can be solicited (for example, via interrupt) or unsolicited. As shown in FIG. 4, the phase field value in each outgoing message sent into the outgoing queue such as the sub-queue SQ(0) can be equal to '01' (labeled "Phase='01'" for brevity), the phase field value in each outgoing message sent into the outgoing queue such as the sub-queue SQ(1) can be equal to '10' (labeled "Phase='10'" for brevity), the phase field value in each outgoing message sent into the outgoing queue such as the sub-queue SQ(2) can be equal to '11' (labeled "Phase='11'" for brevity), and the phase field value in each outgoing message sent into the outgoing queue such as the sub-queue SQ(3) can be equal to '00' (labeled "Phase='00'" for brevity), but the present invention is not limited thereto. For brevity, similar descriptions for this embodiment are not repeated in detail here.

Figure 5:
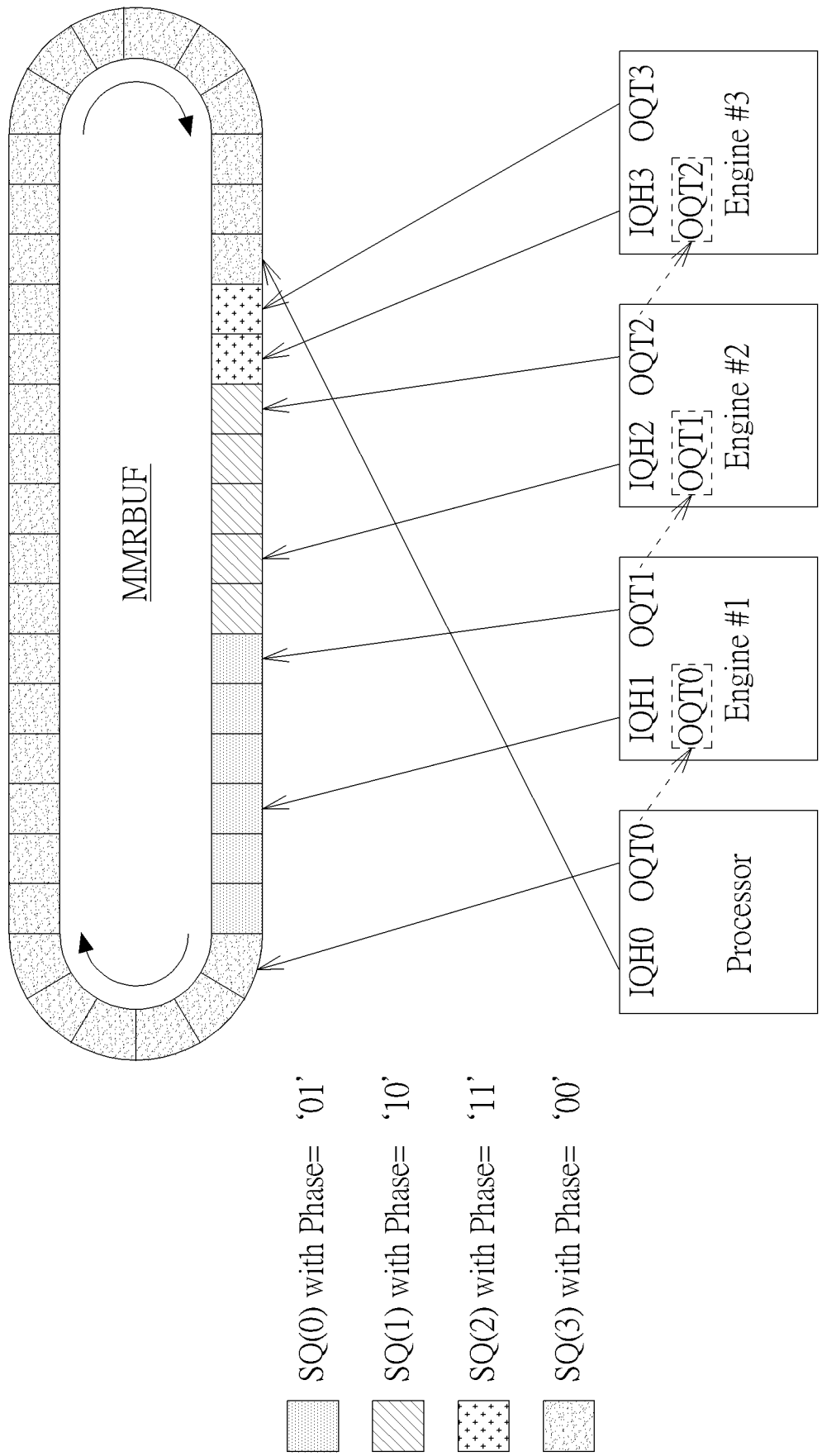
FIG. 5 illustrates a hybrid control scheme of the method according to an embodiment of the present invention.

FIG. 5 illustrates a hybrid control scheme of the method according to an embodiment of the present invention. The processor or the any engine can operate according to one or more control schemes among the OQT remote update control scheme shown in FIG. 3 and the phase check control scheme shown in FIG. 4. For example, some operations of the processor and the engines #1, /2 and #3 may conform to the OQT remote update control scheme shown in FIG. 3, and the processor and all of the engines #1, /2 and #3 can operate according to the phase check control scheme shown in FIG. 4, but the present invention is not limited thereto. For brevity, similar descriptions for this embodiment are not repeated in detail here.

Figure 6:
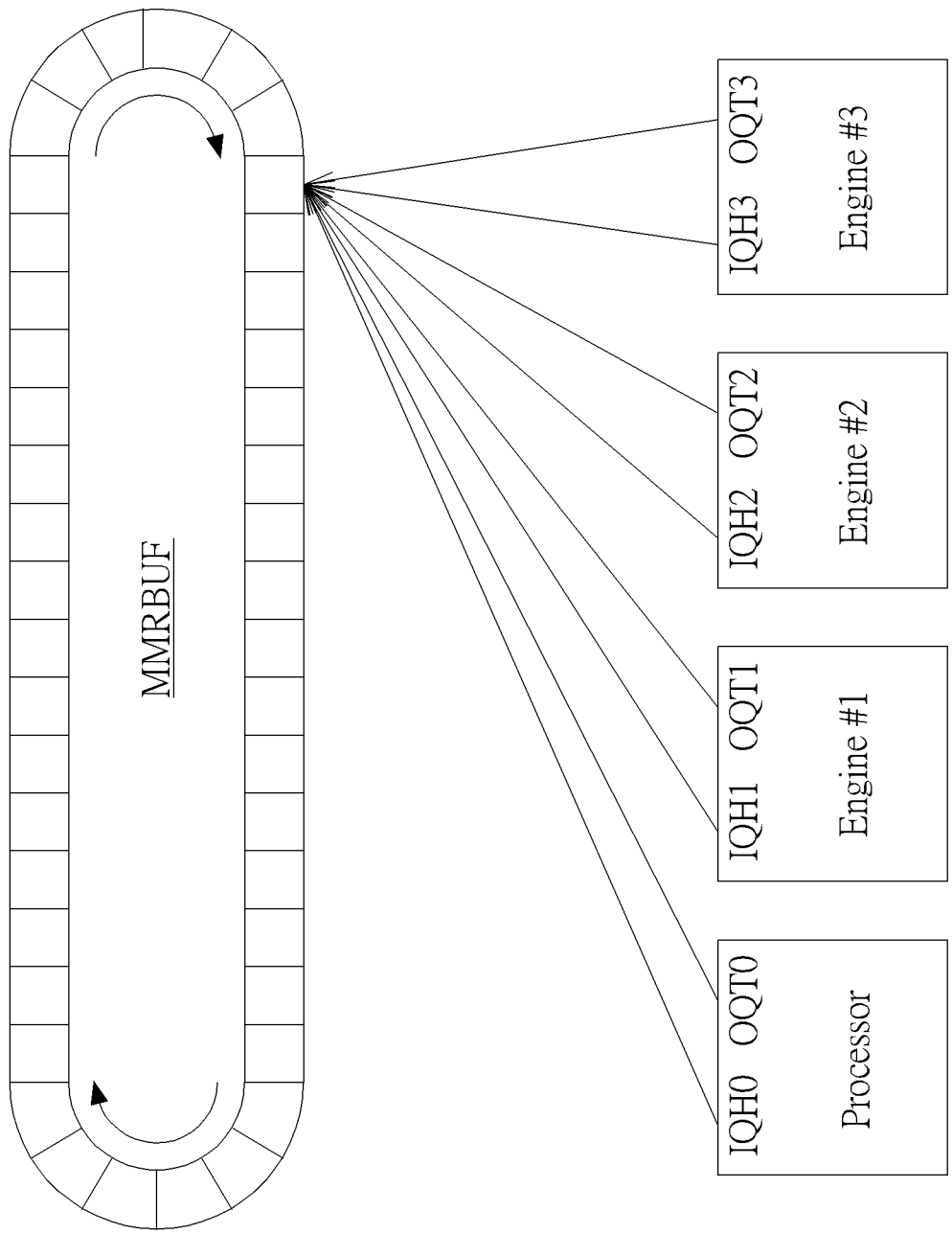
FIG. 6 illustrates an initial state before a series of operations of the multi-phase queue control scheme shown in FIG. 2 according to an embodiment of the present invention.

FIG. 6 illustrates an initial state before a series of operations of the multi-phase queue control scheme shown in FIG. 2 according to an embodiment of the present invention. As shown in FIG. 6, all IQHs and all OQTs are set to the same address pointer (e.g. a start address) in the memory-mapped ring buffer MMRBUF. This initial state is the logical state where there is no any outstanding message (e.g. request or completion) in any queue or any engine, and the processor keeps all the entries. In this state, there is no any head or tail pointer that can move except the processor's OQT (e.g. the OQT OQT0).

Figure 7:
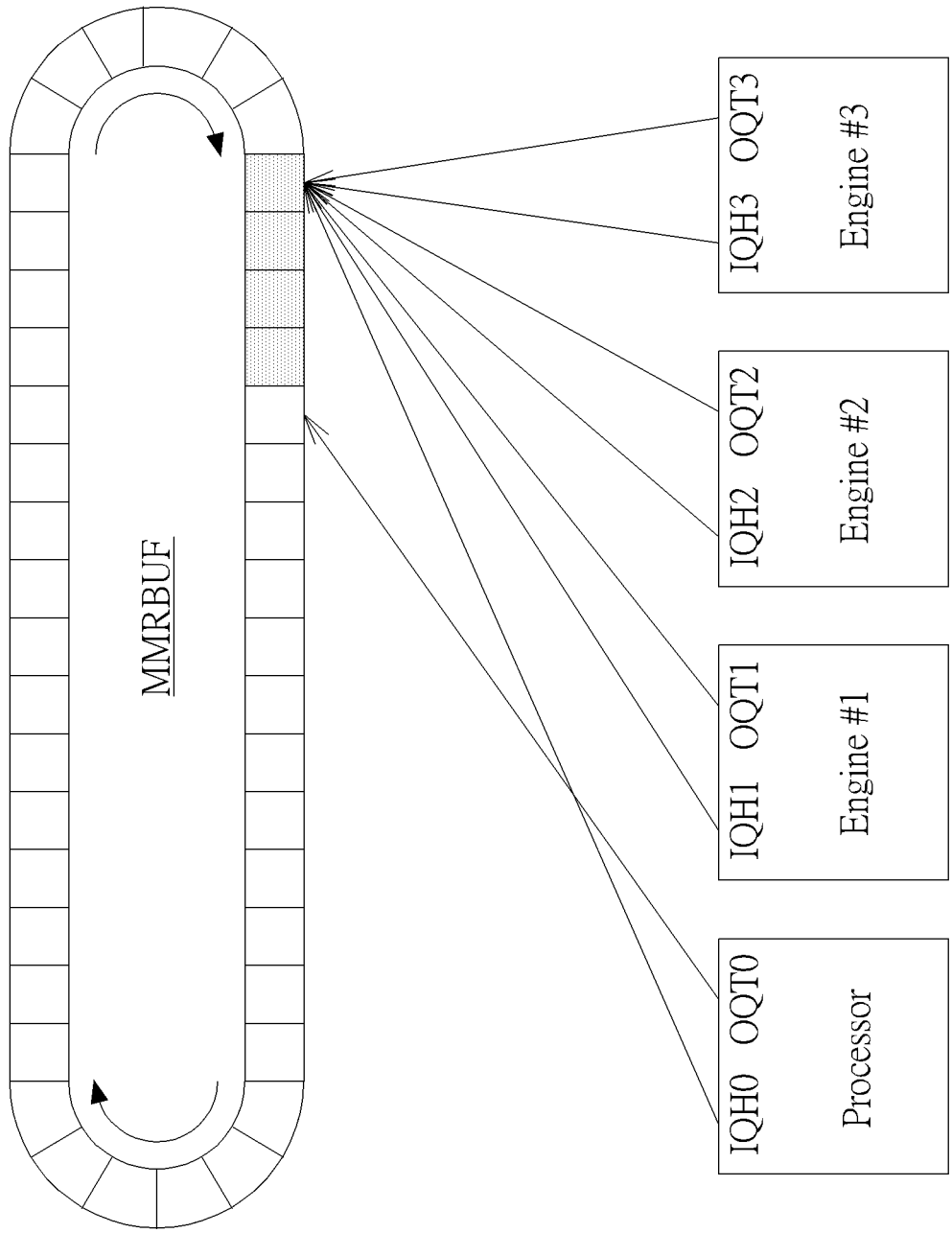
FIG. 7 illustrates a first intermediate state after one or more first operations among the series of operations of the multi-phase queue control scheme shown in FIG. 2.

FIG. 7 illustrates a first intermediate state after one or more first operations among the series of operations of the multi-phase queue control scheme shown in FIG. 2. In the one or more first operations, the processor en-queues four entries into outgoing queue such as the sub-queue SQ(0) to the engine #1.

Figure 8:
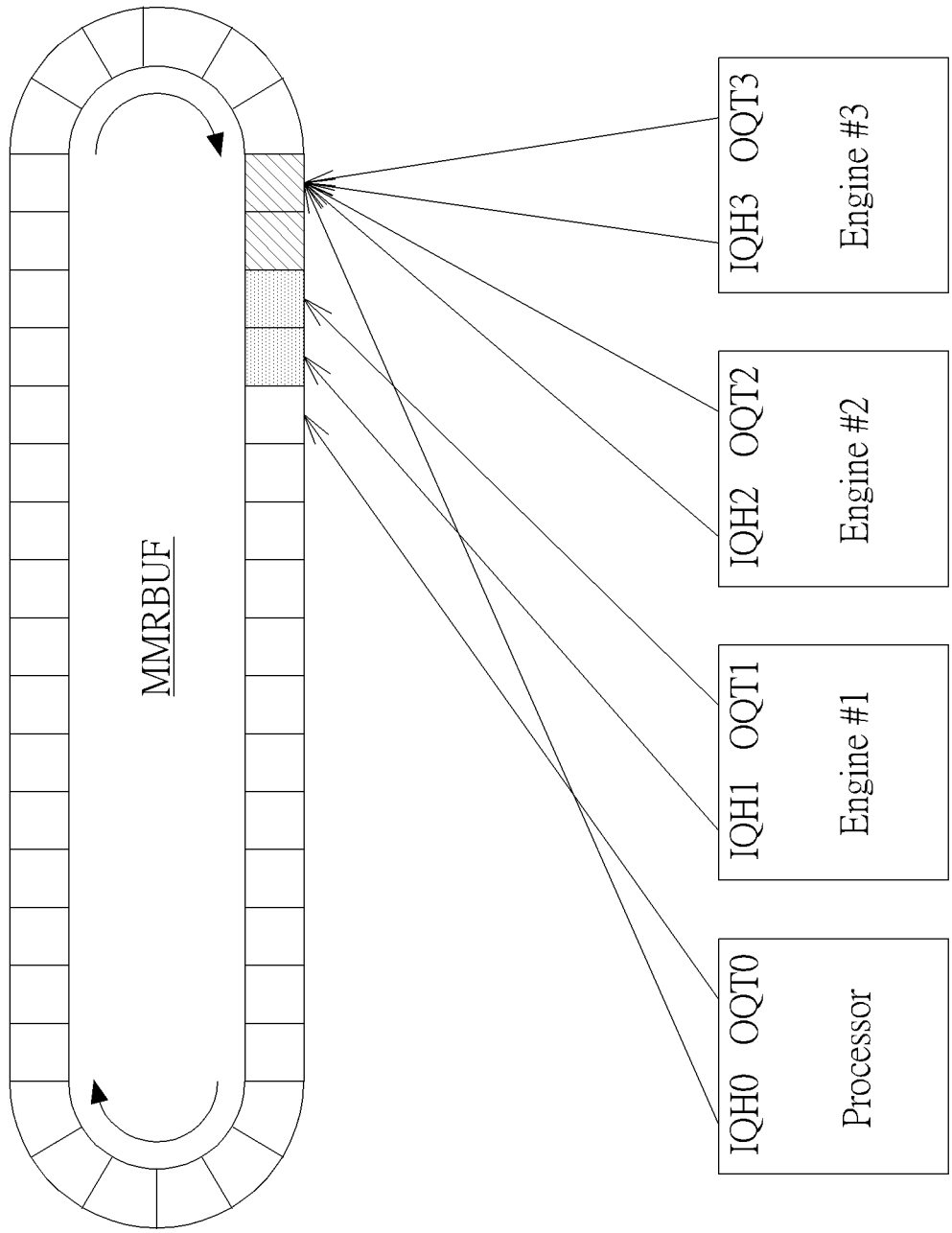
FIG. 8 illustrates a second intermediate state after one or more second operations among the series of operations of the multi-phase queue control scheme shown in FIG. 2.

FIG. 8 illustrates a second intermediate state after one or more second operations among the series of operations of the multi-phase queue control scheme shown in FIG. 2. In the one or more second operations, the engine #1 de-queues three entries from the incoming queue such as the sub-queue SQ(0) and en-queues two entries into the outgoing queue such as the sub-queue SQ(1) to the engine #2.

Figure 9:
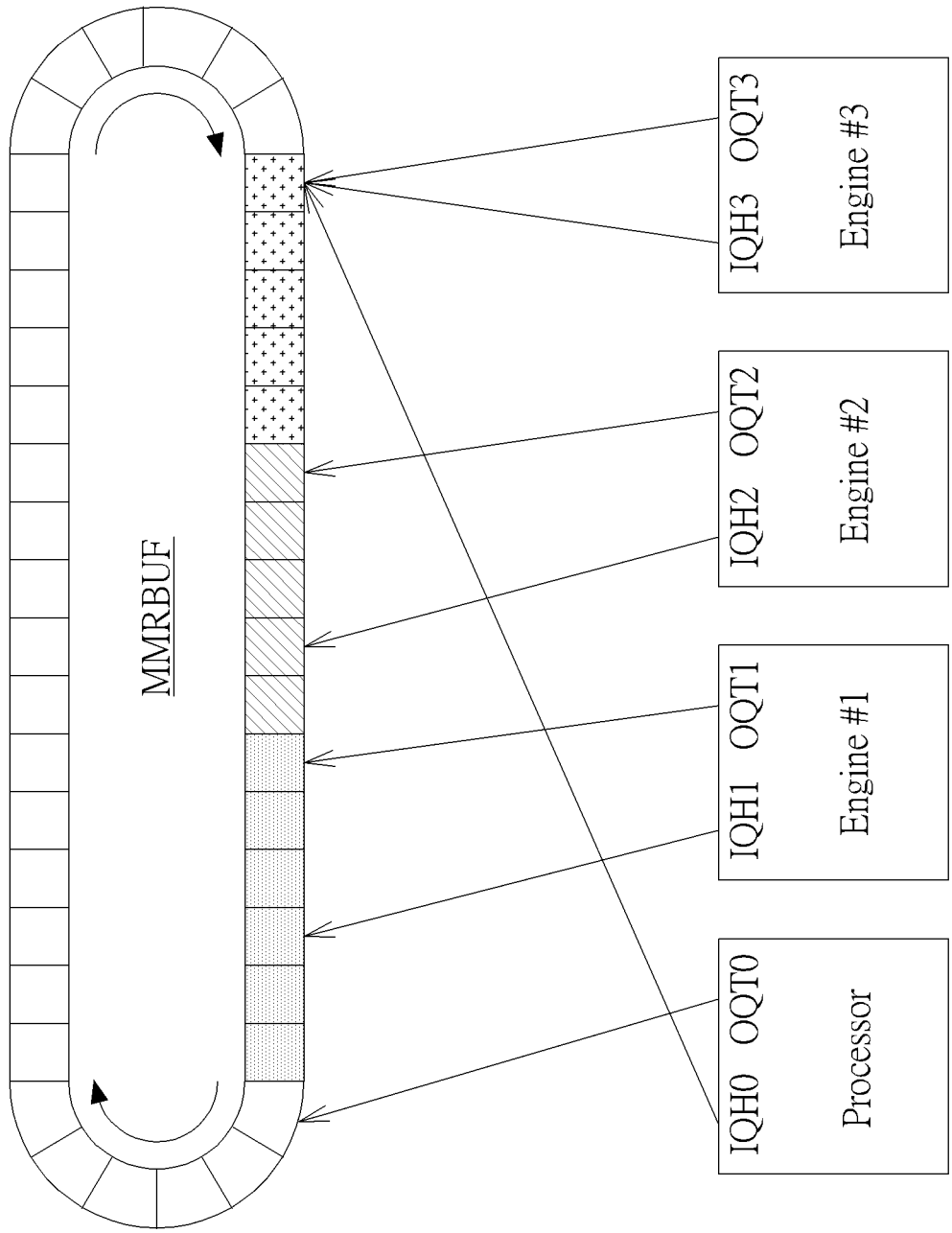
FIG. 9 illustrates a third intermediate state after one or more third operations among the series of operations of the multi-phase queue control scheme shown in FIG. 2.

FIG. 9 illustrates a third intermediate state after one or more third operations among the series of operations of the multi-phase queue control scheme shown in FIG. 2. In the one or more third operations, the processor en-queues twelve entries in the outgoing queue such as the sub-queue SQ(0) to the engine #1, the engine #1 de-queues ten entries from the incoming queue such as the sub-queue SQ(0) and en-queues eight entries to the outgoing queue such as the sub-queue SQ(1) to the engine #2, and the engine #2 de-queues eight entries from the incoming queue such as the sub-queue SQ(1), and en-queue five entries to the outgoing queue such as the sub-queue SQ(2) to the engine #3.

Figure 10:
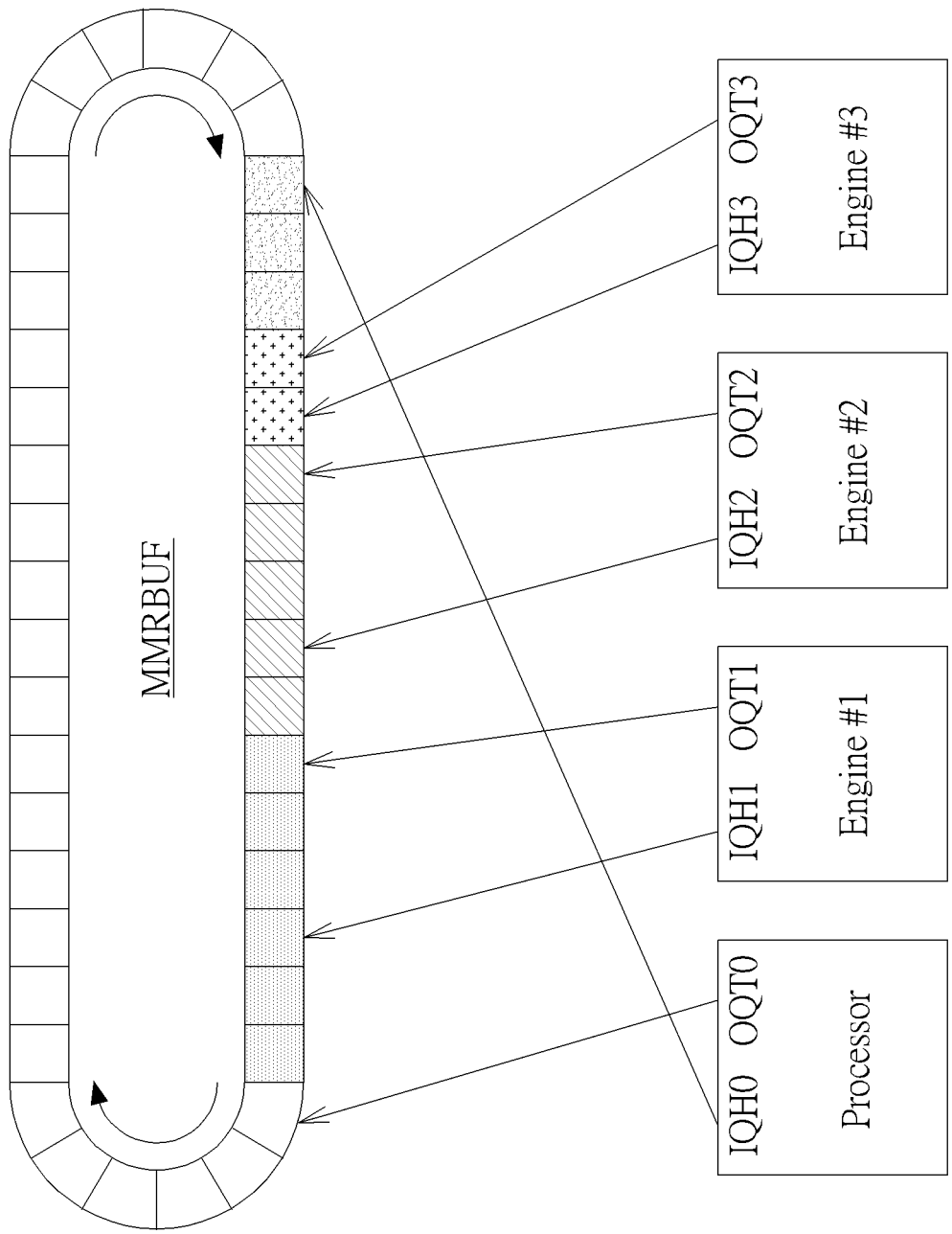
FIG. 10 illustrates a fourth intermediate state after one or more fourth operations among the series of operations of the multi-phase queue control scheme shown in FIG. 2.

FIG. 10 illustrates a fourth intermediate state after one or more fourth operations among the series of operations of the multi-phase queue control scheme shown in FIG. 2. In the one or more fourth operations, the engine #3 de-queues four entries from the incoming queue such as the sub-queue SQ(2) and en-queues three entries into the outgoing queue such as the sub-queue SQ(3) to the processor.

Figure 11:
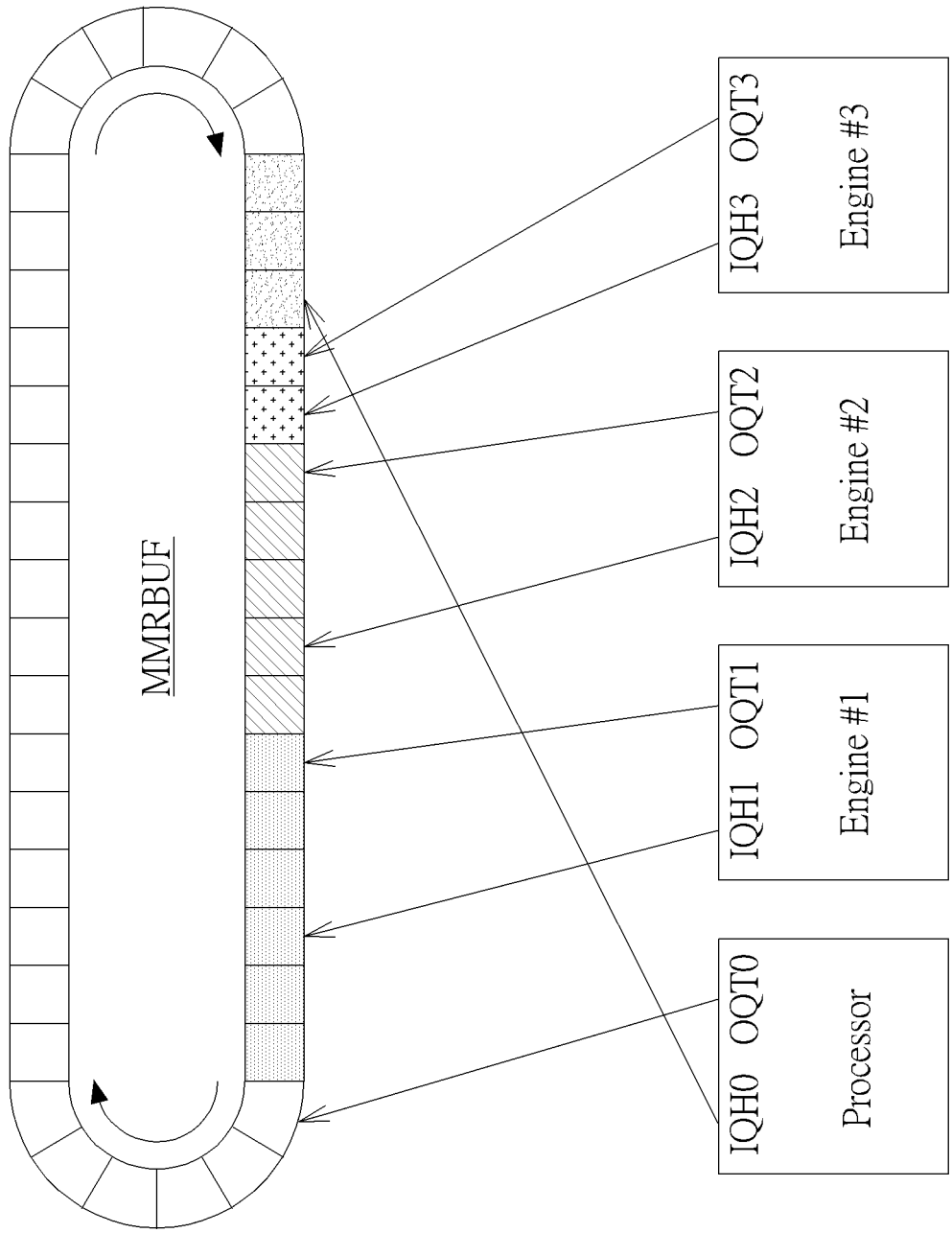
FIG. 11 illustrates a fifth intermediate state after one or more fifth operations among the series of operations of the multi-phase queue control scheme shown in FIG. 2.

FIG. 11 illustrates a fifth intermediate state after one or more fifth operations among the series of operations of the multi-phase queue control scheme shown in FIG. 2. In the one or more fifth operations, the processor de-queues two entries from the incoming queue such as the sub-queue SQ(3). For example, the processor or the any engine can perform additional operations among the series of operations.

Figure 12:
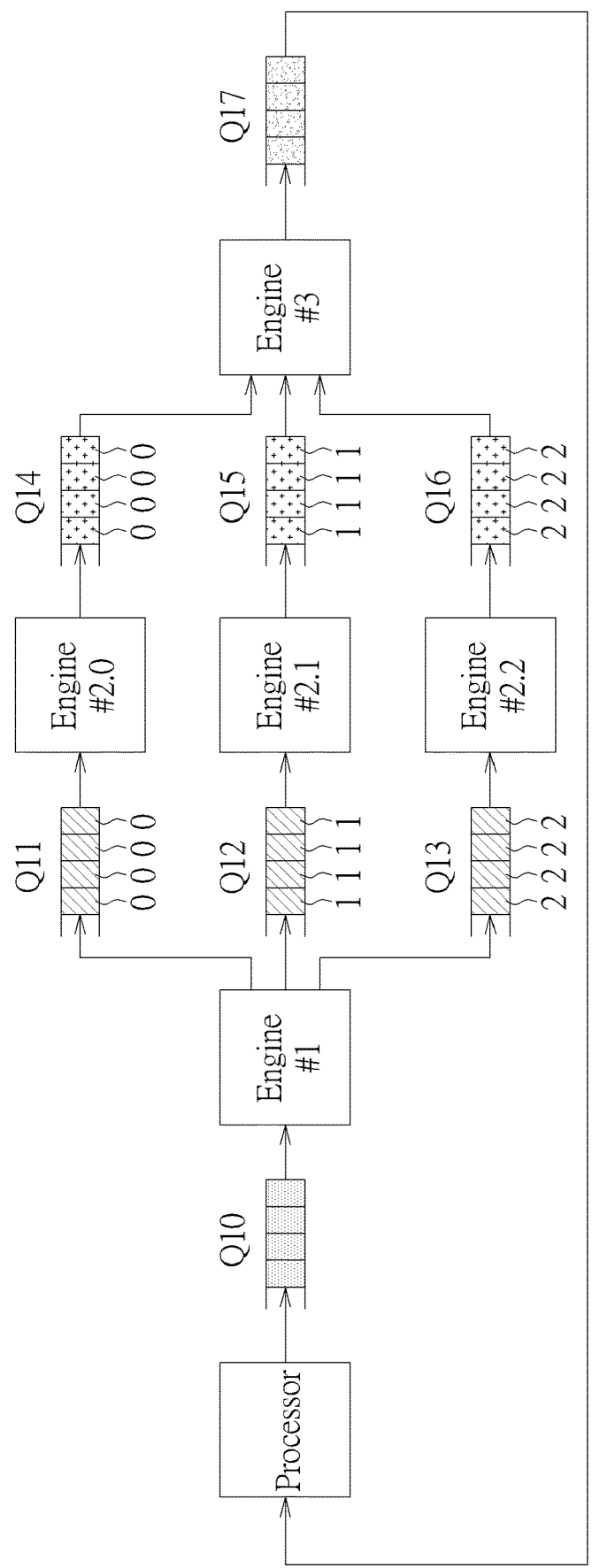
FIG. 12 illustrates a queue split and merge control scheme of the method according to an embodiment of the present invention.

FIG. 12 illustrates a queue split and merge control scheme of the method according to an embodiment of the present invention. For better comprehension, some changes of the sub-queues and associated partial message flows may be explained with a logical view as shown in FIG. 12. For example, the sub-queue SQ(0) may be regarded as a request queue Q10, and the sub-queue SQ(3) may be regarded as a completion queue Q17. As the engine #2 is split into Y engines (e.g. the symbol "Y" may represent a positive integer that is greater than one) such as three engines #2.0,

2.1 and #2.2, the partial message flow between the engines #1 and #2 may be logically split into three partial message flows, and therefore the sub-queue SQ(1) may be logically split into corresponding sub-queues such as chained request queues Q11-Q13, where some queue entries of the chained request queues Q11-Q13 may be respectively labeled "0", "1" and "2" for indicating that they are on the three partial message flows from the engine #1 to the three engines #2.0, #2.1 and #2.2. Similarly, as the engine #2 is split into the Y engines such as the three engines #2.0, #2.1 and #2.2, the partial message flow between the engines #2 and #3 may be logically split into three partial message flows, and therefore the sub-queue SQ(2) may be logically split into corresponding sub-queues such as chained request queues Q14-Q16, where some queue entries of the chained request queues Q14-Q16 may be respectively labeled "0", "1" and "2" for indicating that they are on the three partial message flows from the three engines #2.0, #2.1 and #2.2 to the engine #3. For brevity, similar descriptions for this embodiment are not repeated in detail here.

Figure 13:
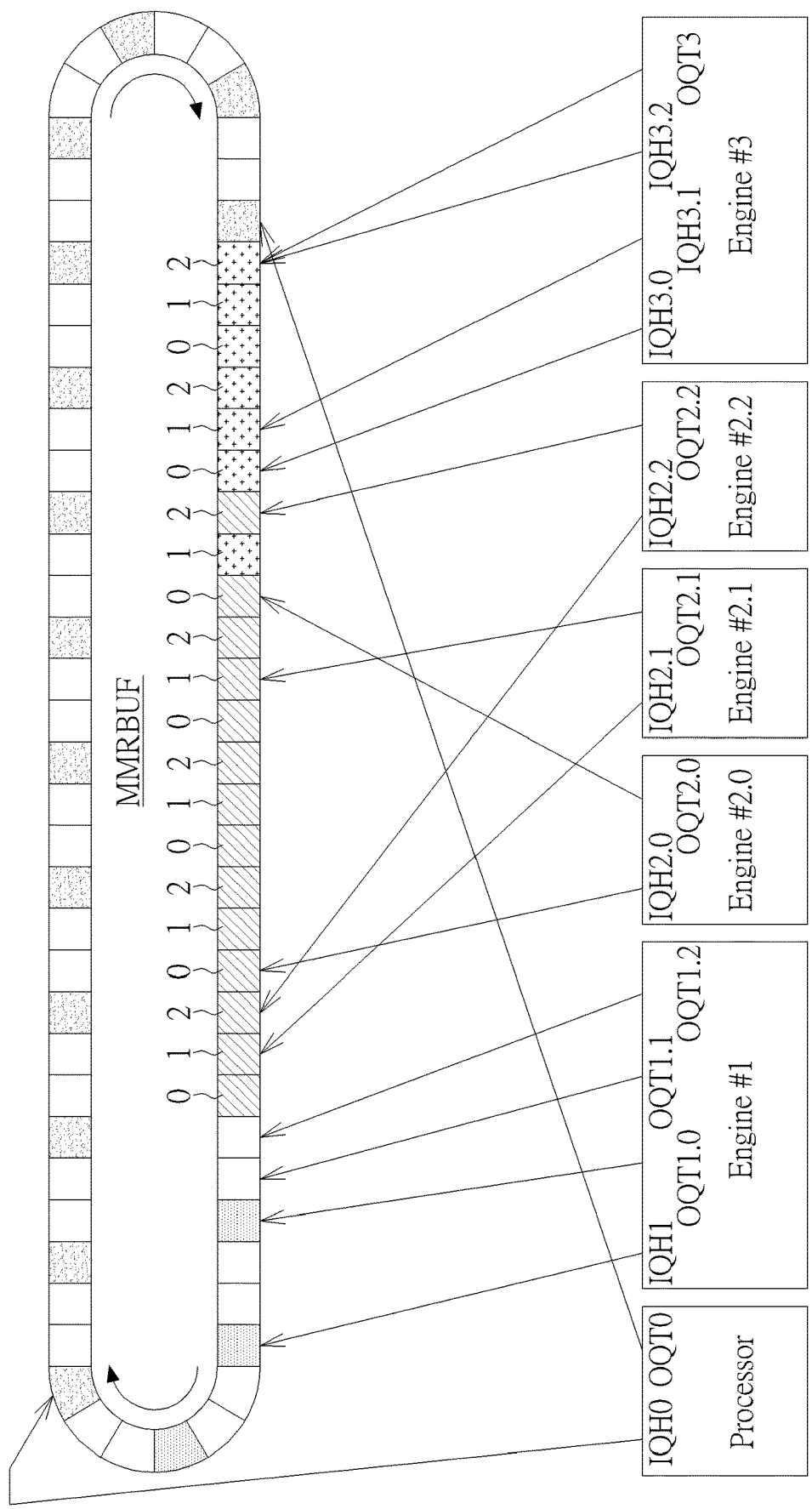
FIG. 13 illustrates some implementation details of the queue split and merge control scheme shown in FIG. 12 according to an embodiment of the present invention.

FIG. 13 illustrates some implementation details of the queue split and merge control scheme shown in FIG. 12 according to an embodiment of the present invention. The sub-queues SQ(0) and SQ(3) that are not related to queue split and merge may be regarded as the request queue Q10 and the completion queue Q17, respectively. Regarding implementation of queue split and merge, the sub-queue SQ(1) may be regarded as a combination of the chained request queues Q11-Q13, and the sub-queue SQ(2) may be regarded as a combination of the chained request queues Q14-Q16. The respective queue entries of the chained request queues Q11-Q13, such as the queue entries respectively labeled "0", "1" and "2" among the queue entries having the shading pattern corresponding to the sub-queue SQ(1), may be arranged in turn in a predetermined order (e.g. the order of the three partial message flows from the engine #1 to the three engines #2.0, #2.1 and #2.2). In addition, the respective queue entries of the chained request queues Q14-Q16, such as the queue entries respectively labeled "0", "1" and "2" among the queue entries having the shading pattern corresponding to the sub-queue SQ(2), may be arranged in turn in a predetermined order (e.g. the order of the three partial message flows from the three engines #2.0, #2.1 and #2.2 to the engine #3). For brevity, similar descriptions for this embodiment are not repeated in detail here.

According to some embodiments, in a situation where the split is 1:Y (e.g. the engine #2 is split into the Y engines), the queue entries before the split phase and after the merged phase can be gaped for (Y−1). Hence the queue tails and the queue heads for those phases are incremental of Y. In addition, for the split queues, the queue tails and the queue heads shall be incremental of Y as well, but for any two split queues among the split queues corresponding to the same sub-queue SQ(x), the respective offsets of the any two split queues are different from each other. Taking the architecture shown in FIG. 13 as an example, the queue entries having the shading pattern corresponding to the sub-queue SQ(0) and the queue entries having the shading pattern corresponding to the sub-queue SQ(3) can be gaped for (3−1)=2 (e.g. there are two vacant queue elements between two continuous queue entries among these queue entries), and any OQT of the OQTs OQT(0), OQT(1.0), OQT(1.1), OQT(1.2), OQT(2.0), OQT(2.1), OQT(2.2) and OQT(3) (respectively labeled "OQT0", "OQT1.0", "OQT1.1", "OQT1.2", "OQT2.0", "OQT2.1", "OQT2.2" and "OQT3" for brevity) or any IQH of the IQHs IQH(0), IQH(1), IQH(2.0), IQH (2.1), IQH(2.2), IQH(3.0), IQH(3.1) and IQH(3.2) (respectively labeled "IQH0", "IQH1", "IQH2.0", "IQH2.1", "IQH2.2", "IQH3.0", "IQH3.1" and "IQH3.2" for brevity) can increase with an increment of three. For brevity, similar descriptions for these embodiments are not repeated in detail here.

In the queue split and merge control scheme, the engine #2 can be taken as an example of a processing/secondary processing circuit being split among all processing/secondary processing circuits, but the present invention is not limited thereto. According to some embodiments, the processing/secondary processing circuit being split and/or the number of processing/secondary processing circuits being split may vary. For example, the processing/secondary processing circuit being split can be the processor or another engine among the engines #1, #2, etc. For another example, there may be more than one processing/secondary processing circuit being split.

Figure 14:
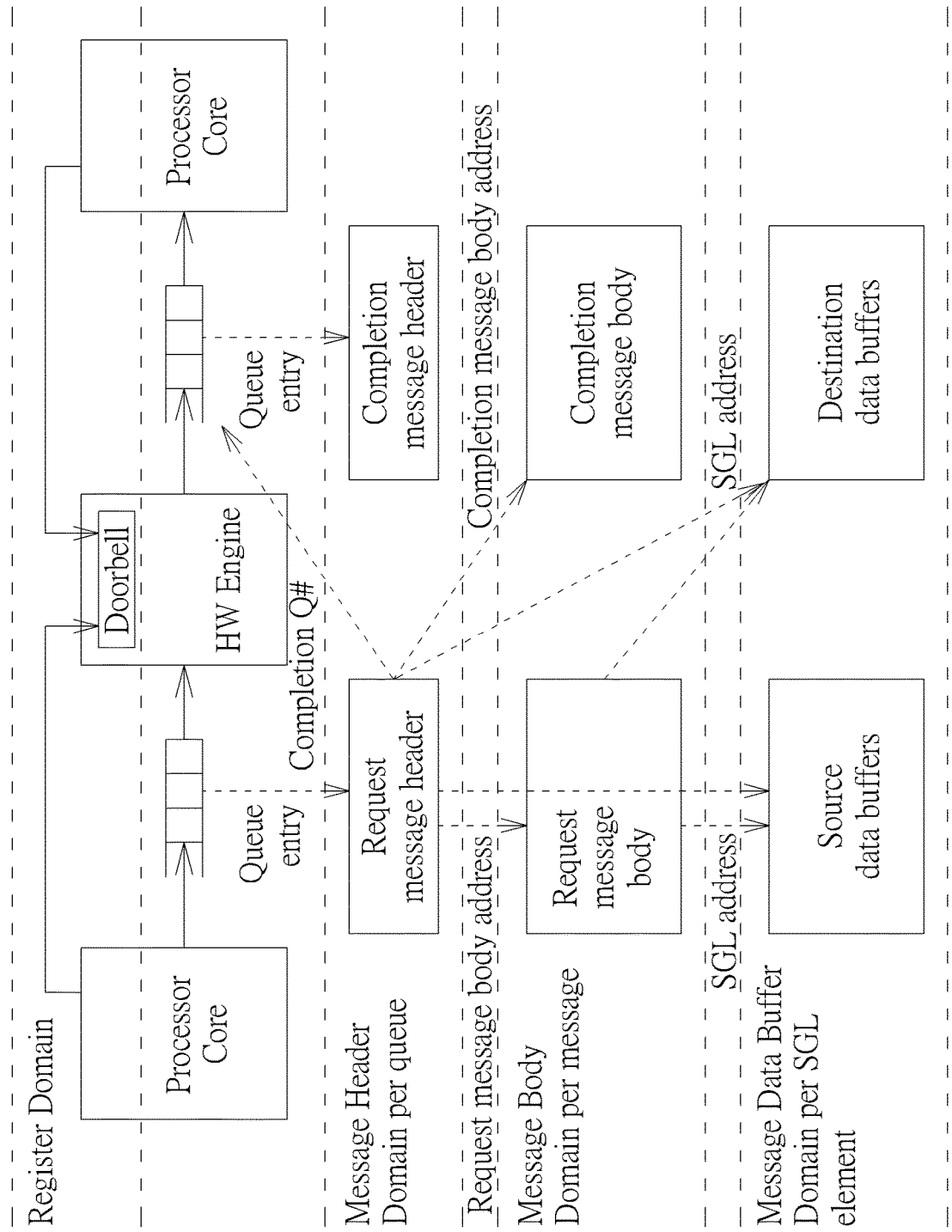
FIG. 14 illustrates a multi-memory-domain attributes control scheme of the method according to an embodiment of the present invention.

FIG. 14 illustrates a multi-memory-domain attributes control scheme of the method according to an embodiment of the present invention. A set of memory domains can be mapped with flat address, and the ways regarding how a processing/secondary processing circuit such as a processor/processor core, a hardware (HW) engine, etc. accesses attributes for any two memory domains among the set of memory domains may be different from each other. For example, the set of memory domains may comprise:

(1) a doorbell register domain (labeled "Register Domain" for brevity), where the processing/secondary processing circuit (e.g. the processor core or the hardware engine) may access doorbell registers (labeled "Doorbell" for brevity) in the doorbell register domain for chained messages;

(2) a message header domain (which can also be referred to as the queue entry domain, since message headers form queue entries), where the processing/secondary processing circuit (e.g. the processor core or the hardware engine) may access the queue entries such as the message headers (e.g. a request message header and a completion message header) in the message header domain, and this memory domain for the queue entries shall be configured on per queue base (labeled "per queue" for brevity) via per queue registers, for example, the memory of the message header domain can be any of a coherent domain level-one cache (L1$), a coherent domain level-two cache (L2$), etc. or any of non-coherent data/message memories;

(3) a message body domain, where the processing/secondary processing circuit (e.g. the processor core or the hardware engine) may access the message bodies (e.g. a request message body and a completion message body) in the message body domain, and the message body domain for a message shall be set or configured on per message base (labeled "per message" for brevity) via message header, for example, the memory of the message body domain can be any of a coherent domain level-one cache (L1$), a coherent domain level-two cache (L2$), etc. or any of non-coherent data/message memories; and (4) a message data buffer domain, where the processing/secondary processing circuit (e.g. the processor core or the hardware engine) may access the message data buffers (e.g. source data buffers and destination data buffers) in the message data buffer domain, and the message data buffer domain shall be set or configured on per scatter gather list (SGL) element base (labeled "per SGL element" for brevity) in a message header or a message body;

but the present invention is not limited thereto. For example, the request message header may comprise a completion queue number (labeled "Completion Q#" for brevity) pointing toward the associated completion queue, a request message body address pointing toward the request message body, a completion message body address pointing toward the completion message body, a SGL address pointing toward the source data buffers, and a SGL address pointing toward the destination data buffers; and the request message body may comprise the SGL address pointing toward the source data buffers, and the SGL address pointing toward the destination data buffers.

Figure 15:
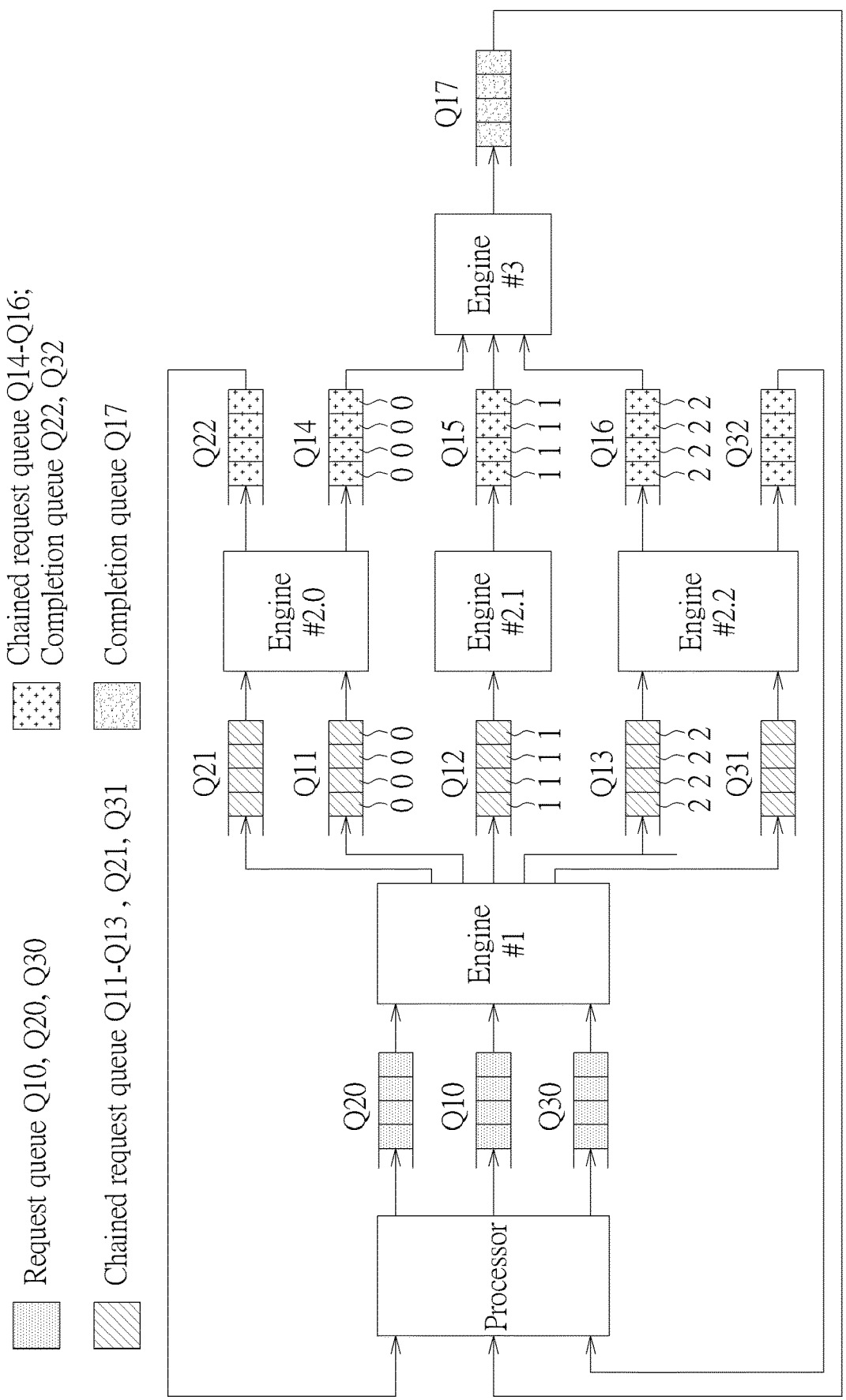
FIG. 15 illustrates a queue split and merge control scheme of the method according to another embodiment of the present invention.

FIG. 15 illustrates a queue split and merge control scheme of the method according to another embodiment of the present invention. In comparison with the architecture shown in FIG. 13, some partial message flows may be further split into more partial message flows, and the associated sub-queues may be split correspondingly. For example, the sub-queue SQ(0) may be regarded as a combination of the request queues Q10, Q20 and Q30, the sub-queue SQ(1) may be regarded as a combination of the chained request queues Q11-Q13, Q21 and Q31, and the sub-queue SQ(2) may be regarded as a combination of the chained request queues Q14-Q16 and the completion queues Q22 and Q32, where the sub-queue SQ(3) that is not related to queue split and merge may be regarded as the completion queue Q17. For brevity, similar descriptions for this embodiment are not repeated in detail here.

Figure 16A:
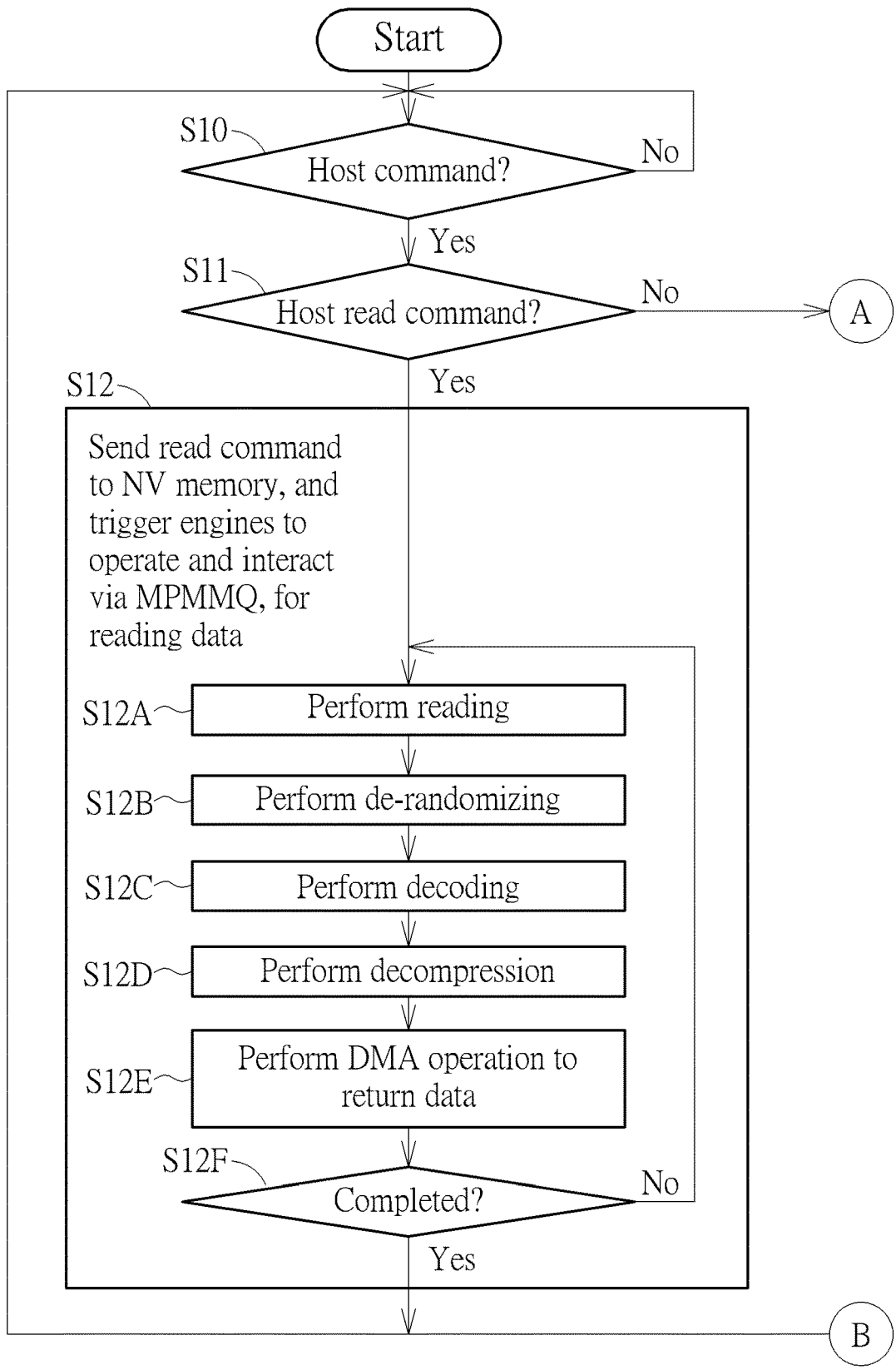
FIG. 16A illustrates a first portion of a flowchart of the method according to an embodiment of the present invention.
Figure 16B:
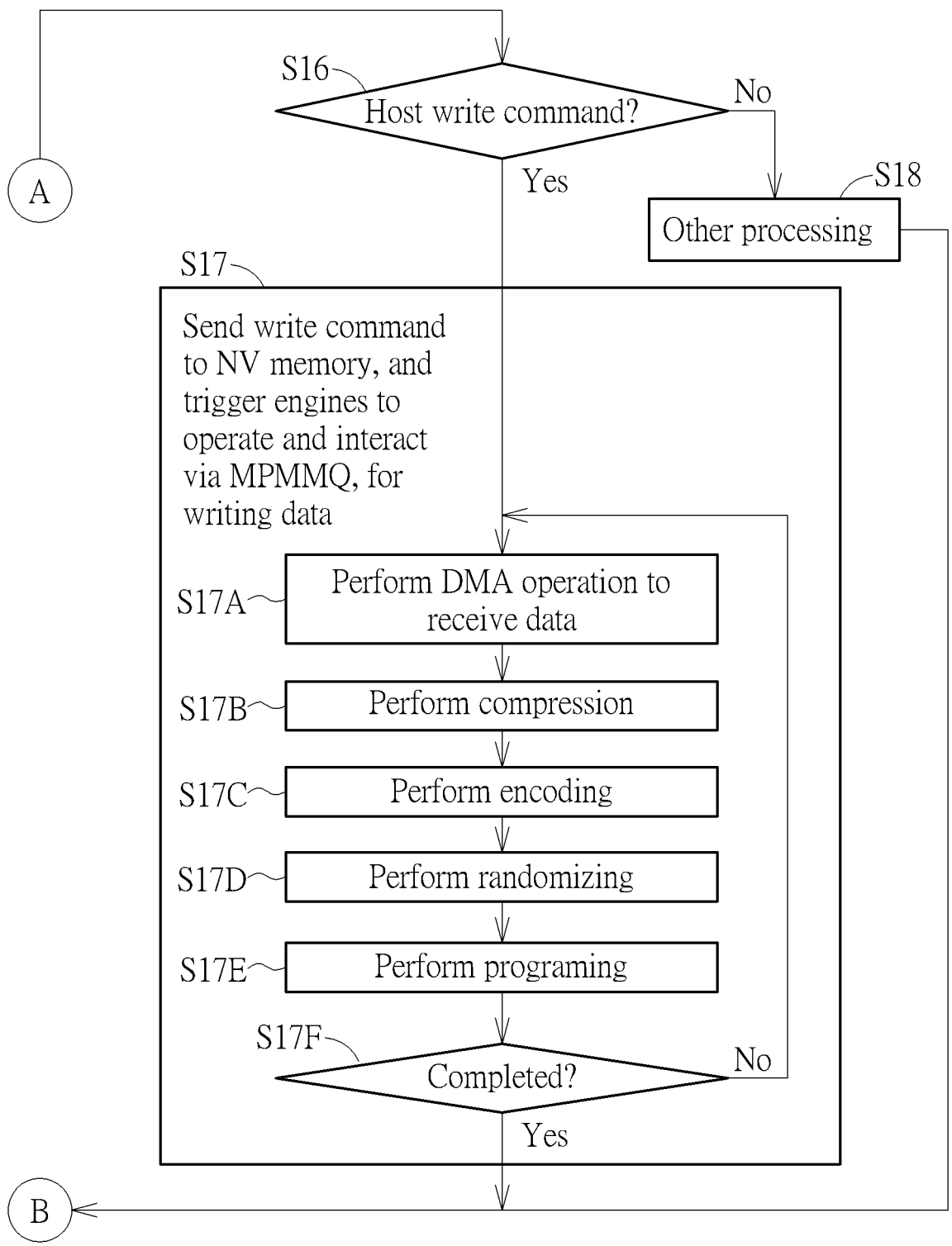
FIG. 16B illustrates a second portion of the flowchart of the method.

FIG. 16A and FIG. 16B respectively illustrate a first portion and a second portion of a flowchart of the method according to an embodiment of the present invention, where the nodes A and B may indicate the connections between respective partial working flows of FIG. 16A and FIG. 16B. The method can be applied to the architecture shown in FIG. 1 (e.g. the electronic device 10, the memory device 100, the memory controller 110, and the microprocessor 112), and can be executed by the memory controller 110 (e.g. the microprocessor 112) of the memory device 100. During a first type of accessing operation (e.g. one of data reading and data writing) as requested by the host device 50, the processing circuit such as the microprocessor 112 and a first set of secondary processing circuits such as a set of engines corresponding to the first type of accessing operation among the engines #1, #2, etc. can share the multi-phase memory-mapped queue MPMMQ (e.g. the memory-mapped ring buffer MMRBUF), and use the multi-phase memory-mapped queue MPMMQ as multiple chained message queues associated with multiple phases (e.g. the multiple sub-queues {SQ(x)} respectively corresponding to the multiple phases {Phase(x)}, configured for the first type of accessing operation), respectively, for performing message queuing for a chained processing architecture comprising the processing circuit and the first set of secondary processing circuits. In addition, during a second type of accessing operation (e.g. another of data reading and data writing) as requested by the host device 50, the processing circuit such as the microprocessor 112 and a second set of secondary processing circuits such as a set of engines corresponding to the second type of accessing operation among the engines #1, #2, etc. can share the multi-phase memory-mapped queue MPMMQ (e.g. the memory-mapped ring buffer MMRBUF), and use the multi-phase memory-mapped queue MPMMQ as multiple other chained message queues associated with multiple other phases (e.g. the multiple sub-queues {SQ(x)} respectively corresponding to the multiple phases {Phase(x)}, configured for the second type of accessing operation), respectively, for performing message queuing for another chained processing architecture comprising the processing circuit and the second set of secondary processing circuits.

In Step S10, the memory controller 110 (e.g. the microprocessor 112) can determine whether a host command (e.g. one of the plurality of host commands) is received. If Yes, Step S11 is entered; if No, Step S10 is entered.

In Step S11, the memory controller 110 (e.g. the microprocessor 112) can determine whether the host command (i.e. the host command that is just received as detected in Step S10) is a host read command. If Yes, Step S12 is entered; if No, Step S16 is entered. The host read command may indicate reading data at a first logical address.

In Step S12, in response to the host read command (i.e. the host read command that is just received as detected in Steps S10 and S11), the memory controller 110 (e.g. the microprocessor 112) can send a first operation command (e.g. one of the operation commands mentioned above) such as a read command to the NV memory 120 through the control logic circuit 114, and trigger a first set of engines to operate and interact via the multi-phase memory-mapped queue MPMMQ (e.g. the memory-mapped ring buffer MMRBUF), for reading the data (e.g. the data to be read as requested by the host device 50) for the host device 50, where the first operation command such as the read command may carry a first physical address associated with the first logical address, for indicating a certain storage location within the NV memory 120, and the first physical address may be determined by the memory controller 110 (e.g. the microprocessor 112) according to the at least one L2P address mapping table.

For example, the first set of engines may comprise the de-randomizing engine (e.g. the de-randomizer), the decoding engine (e.g. the decoder), the de-compression engine and the DMA engine, and the processing circuit such as the microprocessor 112 and the secondary processing circuits such as these engines may form a chained processing architecture similar to that of the multi-phase queue control scheme shown in the lower half FIG. 2, where the processor and the engines #1, #2, etc. in the multi-phase queue control scheme may represent the microprocessor 112 and these engines in the order as listed above, respectively, but the present invention is not limited thereto. According to some embodiments, the first set of engines and the associated chained processing architecture may vary.

In Step S12A, the memory controller 110 (e.g. the microprocessor 112) can utilize the control logic circuit 114 to perform reading on the NV memory 120, and more particularly, read at a location (e.g. a certain physical address within a physical address range starting from the first physical address) of the NV memory 120 to obtain read data from the NV memory 120.

In Step S12B, the memory controller 110 (e.g. the microprocessor 112) can utilize the de-randomizing engine (e.g. the de-randomizer) to perform de-randomizing such as the de-randomizing operations on the read data to generate de-randomized data.

In Step S12C, the memory controller 110 (e.g. the microprocessor 112) can utilize the decoding engine (e.g. the decoder) to perform decoding such as the decoding operations on the de-randomized data to generate decoded data (e.g. error-corrected data, such as the data corrected according to the parity data).

In Step S12D, the memory controller 110 (e.g. the microprocessor 112) can utilize the de-compression engine to perform de-compression such as the de-compression operations on the decoded data to generate de-compressed data as partial data of the data for being transmitted (e.g. returned) to the host device 50.

In Step S12E, the memory controller 110 (e.g. the microprocessor 112) can utilize the DMA engine to perform the DMA operations on the second host-side memory region of the memory in the host device 50 through the transmission interface circuit 118, in order to transmit (e.g. return) the partial data of the data (e.g. the data to be read as requested by the host device 50) to the second host-side memory region through the transmission interface circuit 118.

In Step S12F, the memory controller 110 (e.g. the microprocessor 112) can check whether the data reading of the whole of the data (e.g. the data to be read as requested by the host device 50) is completed. If Yes, Step S10 is entered; if No, Step S12A is entered.

For the data reading performed through the loop comprising the sub-steps (e.g. Steps S12A-S12F) of Step S12, the multi-phase memory-mapped queue MPMMQ comprising the multiple chained message queues for the data reading (e.g. the multiple sub-queues {SQ(x)}, configured for the data reading) is implemented within the single memory-mapped ring buffer such as the memory-mapped ring buffer MMRBUF, and each chained message queue of the multiple chained message queues is associated with a phase among the multiple phases (e.g. the multiple phases {Phase(x)}, configured for the data reading), where the multi-phase memory-mapped queue is transparent to each of the processing circuit (e.g. the microprocessor 112) and the set of secondary processing circuits corresponding to the data reading (e.g. the first set of engines, such as the de-randomizing engine, the decoding engine, the de-compression engine and the DMA engine) for en-queuing or de-queuing operations. Under control of at least one circuit (e.g. one or more circuits) among the processing circuit and the set of secondary processing circuits corresponding to the data reading, the multiple sub-queues {SQ(x)} respectively corresponding to the multiple phases {Phase(x)} can be configured to have dynamically adjusted queue lengths, such as the respective queue lengths of the sub-queues SQ(0), SQ(1), etc., for being used as the multiple chained message queues for the data reading.

In Step S16, the memory controller 110 (e.g. the microprocessor 112) can determine whether the host command (i.e. the host command that is just received as detected in Step S10) is a host write command. If Yes, Step S17 is entered; if No, Step S18 is entered. The host write command may indicate writing data at a second logical address.

In Step S17, in response to the host write command (i.e. the host write command that is just received as detected in Steps S10 and S16), the memory controller 110 (e.g. the microprocessor 112) can send a second operation command (e.g. another of the operation commands mentioned above) such as a write command to the NV memory 120 through the control logic circuit 114, and trigger a second set of engines to operate and interact via the multi-phase memory-mapped queue MPMMQ (e.g. the memory-mapped ring buffer MMRBUF), for writing the data (e.g. the data to be written as requested by the host device 50) for the host device 50, where the second operation command such as the read command may carry a second physical address associated with the second logical address, for indicating a certain storage location within the NV memory 120, and the second physical address may be determined by the memory controller 110 (e.g. the microprocessor 112).

For example, the second set of engines may comprise the DMA engine, the compression engine, the encoding engine (e.g. the encoder) and the randomizing engine (e.g. the randomizer), and the processing circuit such as the microprocessor 112 and the secondary processing circuits such as these engines may form a chained processing architecture similar to that of the multi-phase queue control scheme shown in the lower half FIG. 2, where the processor and the engines #1, #2, etc. in the multi-phase queue control scheme may represent the microprocessor 112 and these engines in the order as listed above, respectively, but the present invention is not limited thereto. According to some embodiments, the second set of engines and the associated chained processing architecture may vary.

In Step S17A, the memory controller 110 (e.g. the microprocessor 112) can utilize the DMA engine to perform the DMA operations on the first host-side memory region of the memory in the host device 50 through the transmission interface circuit 118, in order to receive partial data of the data (e.g. the data to be written as requested by the host device 50) from the first host-side memory region through the transmission interface circuit 118 to be received data.

In Step S17B, the memory controller 110 (e.g. the microprocessor 112) can utilize the compression engine to perform compression such as the compression operations on the received data to generate compressed data.

In Step S17C, the memory controller 110 (e.g. the microprocessor 112) can utilize the encoding engine (e.g. the encoder) to perform encoding such as the encoding operations on the compressed data to generate encoded data (e.g. a combination of the received data and parity data thereof).

In Step S17D, the memory controller 110 (e.g. the microprocessor 112) can utilize the randomizing engine (e.g. the randomizer) to perform randomizing such as the randomizing operations on the encoded data to generate randomized data.

In Step S17E, the memory controller 110 (e.g. the microprocessor 112) can utilize the memory controller 110 (e.g. the microprocessor 112) can utilize the control logic circuit 114 to perform programing, and more particularly, program the randomized data into the NV memory 120.

In Step S17F, the memory controller 110 (e.g. the microprocessor 112) can check whether the data writing of the whole of the data (e.g. the data to be written as requested by the host device 50) is completed. If Yes, Step S10 is entered; if No, Step S17A is entered.

For the data writing performed through the loop comprising the sub-steps (e.g. Steps S17A-S17F) of Step S17, the multi-phase memory-mapped queue MPMMQ comprising the multiple chained message queues for the data writing (e.g. the multiple sub-queues {SQ(x)}, configured for the data writing) is implemented within the single memory-mapped ring buffer such as the memory-mapped ring buffer MMRBUF, and each chained message queue of the multiple chained message queues is associated with a phase among the multiple phases (e.g. the multiple phases {Phase(x)}, configured for the data writing), where the multi-phase memory-mapped queue is transparent to each of the processing circuit (e.g. the microprocessor 112) and the set of secondary processing circuits corresponding to the data writing (e.g. the second set of engines, such as the DMA engine, the compression engine, the encoding engine and the randomizing engine) for en-queuing or de-queuing operations. Under control of at least one circuit (e.g. one or more circuits) among the processing circuit and the set of secondary processing circuits corresponding to the data writing, the multiple sub-queues {SQ(x)} respectively corresponding to the multiple phases {Phase(x)} can be configured to have dynamically adjusted queue lengths, such as the respective queue lengths of the sub-queues SQ(0), SQ(1), etc., for being used as the multiple chained message queues for the data writing.

In Step S18, the memory controller 110 (e.g. the microprocessor 112) can perform other processing. For example, when the host command (i.e. the host command that is just received as detected in Step S10) is another command that is different any of the host read command and the host write command, the memory controller 110 (e.g. the microprocessor 112) can perform the associated operation.

For better comprehension, the method may be illustrated with the working flow shown in FIG. 16A and FIG. 16B, but the present invention is not limited thereto. According to some embodiments, one or more steps may be added, deleted, or changed in the working flow shown in FIG. 16A and FIG. 16B.

According to some embodiments, assuming that X=5, some relationships between the multiple sub-queues {SQ (x)} and associated partial message flows may be described as follows:

(1) an initial partial message flow between the processing circuit (e.g. the microprocessor 112) and a first secondary processing circuit (e.g. the de-randomizing engine) among the set of secondary processing circuits corresponding to the data reading (e.g. the first set of engines) may pass through the sub-queue SQ(0) corresponding to the phase Phase(0);

(2) a first partial message flow between the first secondary processing circuit (e.g. the de-randomizing engine) and a second secondary processing circuit (e.g. the decoding engine) among the set of secondary processing circuits corresponding to the data reading (e.g. the first set of engines) may pass through the sub-queue SQ(1) corresponding to the phase Phase(1);

(3) a second partial message flow between the second secondary processing circuit (e.g. the decoding engine) and a third secondary processing circuit (e.g. the de-compression engine) among the set of secondary processing circuits corresponding to the data reading (e.g. the first set of engines) may pass through the sub-queue SQ(2) corresponding to the phase Phase(2);

(4) a third partial message flow between the third secondary processing circuit (e.g. the de-compression engine) and a fourth secondary processing circuit (e.g. the DMA engine) among the set of secondary processing circuits corresponding to the data reading (e.g. the first set of engines) may pass through the sub-queue SQ(3) corresponding to the phase Phase(3); and (5) a fourth partial message flow between the fourth secondary processing circuit (e.g. the DMA engine) and the processing circuit (e.g. the microprocessor 112) may pass through the sub-queue SQ(4) corresponding to the phase Phase(4);

but the present invention is not limited thereto. For brevity, similar descriptions for these embodiments are not repeated in detail here.

According to some embodiments, assuming that X=5, some relationships between the multiple sub-queues {SQ (x)} and associated partial message flows may be described as follows:

(1) an initial partial message flow between the processing circuit (e.g. the microprocessor 112) and a first secondary processing circuit (e.g. the DMA engine) among the set of secondary processing circuits corresponding to the data writing (e.g. the second set of engines) may pass through the sub-queue SQ(0) corresponding to the phase Phase(0);

(2) a first partial message flow between the first secondary processing circuit (e.g. the DMA engine) and a second secondary processing circuit (e.g. the compression engine) among the set of secondary processing circuits corresponding to the data writing (e.g. the second set of engines) may pass through the sub-queue SQ(1) corresponding to the phase Phase(1);

(3) a second partial message flow between the second secondary processing circuit (e.g. the compression engine) and a third secondary processing circuit (e.g. the encoding engine) among the set of secondary processing circuits corresponding to the data writing (e.g. the second set of engines) may pass through the sub-queue SQ(2) corresponding to the phase Phase(2);

(4) a third partial message flow between the third secondary processing circuit (e.g. the encoding engine) and a fourth secondary processing circuit (e.g. the randomizing engine) among the set of secondary processing circuits corresponding to the data writing (e.g. the second set of engines) may pass through the sub-queue SQ(3) corresponding to the phase Phase(3); and (5) a fourth partial message flow between the fourth secondary processing circuit (e.g. the randomizing engine) and the processing circuit (e.g. the microprocessor 112) may pass through the sub-queue SQ(4) corresponding to the phase Phase(4);

but the present invention is not limited thereto. For brevity, similar descriptions for these embodiments are not repeated in detail here.

It is one of the advantages of the present invention that the present invention method and apparatus can decrease the memory size requirement, for example, share multiple chained queues from only one queue of the same size, and therefore the memory requirement can become 1/X when comparing an X-phase queue with X single phase queues. This is significant since in most of applications, the queue entries are located in coherent memory domain, and each entry is one cache line. In addition, the present invention method and apparatus can merge multiple multi-phase memory mapped queues, and more particularly, add split and merge with synchronization points at some phase of the messages, which can increase parallel operations of multiple engines and therefore decrease latencies for the entire message flow. As it is typical that there are multiple memory domains in a complex SoC design, and as different memory domains may have different memory attributes, the management will be very complicated. The present invention method and apparatus can provide a high performance architecture which is properly designed. To implement a memory mapped queue, four data structures may be needed for the doorbell register, the queue entry, the message body and the data buffer. Depending on applications, SoC device operation status, quality of service (QoS) and performance requirements, each data structure may need to be dynamically mapped to a certain memory domain. The present invention method and apparatus can utilize the generic distributed memory queue system to dynamically configure memory access attributes associated with each domain to achieve the QoS and performance goal. Additionally, for a complex SoC device, a message flow may need to be configured flexibly or even dynamically, depending on specific application, QoS and performance requirements and device status. The present invention method and apparatus can provide flexibility for one engine to be chained among multiple engines and send completion messages in different stages of the message flow. As a result, the overall performance can be enhanced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing access control of a memory device with aid of a multi-phase memory-mapped queue, the method being applied to a controller of the memory device, the memory device comprising the controller and a non-volatile (NV) memory, the NV memory comprising at least one NV memory element, the method comprising:
receiving a first host command from a host device, wherein the first host command indicates accessing first data at a first logical address; and
in response to the first host command, utilizing a processing circuit within the controller to send a first operation command to the NV memory through a control logic circuit of the controller, and trigger a first set of secondary processing circuits within the controller to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

2. The method of claim 1, wherein the multi-phase memory-mapped queue comprising the multiple chained message queues is implemented within a single memory-mapped ring buffer.

3. The method of claim 1, wherein each chained message queue of the multiple chained message queues is associated with a phase among the multiple phases.

4. The method of claim 1, wherein the multi-phase memory-mapped queue is transparent to each of the processing circuit and the first set of secondary processing circuits for en-queuing or de-queuing operations.

5. The method of claim 1, wherein under control of at least one circuit among the processing circuit and the first set of secondary processing circuits, multiple sub-queues respectively corresponding to the multiple phases are configured to have dynamically adjusted queue lengths, for being used as the multiple chained message queues.

6. The method of claim 5, wherein:
a first partial message flow between a first secondary processing circuit and a second secondary processing circuit among the first set of secondary processing circuits passes through a first sub-queue corresponding to a first phase among the multiple sub-queues, and
a second partial message flow between the second secondary processing circuit and a third secondary processing circuit among the first set of secondary processing circuits passes through a second sub-queue corresponding to a second phase among the multiple sub-queues.

7. The method of claim 6, wherein:
a partial message flow between the processing circuit and the first secondary processing circuit passes through another sub-queue corresponding to another phase among the multiple sub-queues.

8. The method of claim 1, wherein the first set of secondary processing circuits comprises a direct memory access (DMA) engine, a decoding engine, and a de-randomizing engine.

9. The method of claim 1, wherein the first set of secondary processing circuits comprises a direct memory access (DMA) engine, an encoding engine, and a randomizing engine.

10. The method of claim 1, further comprising:
receiving a second host command from the host device, wherein the second host command indicates accessing second data at a second logical address; and
in response to the second host command, utilizing the processing circuit within the controller to send a second operation command to the NV memory, and trigger a second set of secondary processing circuits within the controller to operate and interact via the multi-phase memory-mapped queue, for accessing the second data for the host device, wherein the second operation command carries a second physical address associated with the second logical address, for indicating another storage location within the NV memory, and the processing circuit and the second set of secondary processing circuits share the multi-phase memory-mapped queue, and use the multi-phase memory-mapped queue as multiple other chained message queues associated with multiple other phases, respectively, for message queuing for another chained processing architecture comprising the processing circuit and the second set of secondary processing circuits.

11. A system-on-chip (SoC) integrated circuit (IC) that operates according to the method of claim 1, wherein the SoC IC comprises the controller.

12. A memory device, comprising:
a non-volatile (NV) memory, configured to store information, wherein the NV memory comprises at least one NV memory element; and
a controller, coupled to the NV memory, configured to control operations of the memory device, wherein the controller comprises:
a processing circuit, configured to control the controller according to a plurality of host commands from a host device, to allow the host device to access the NV memory through the controller;
a plurality of secondary processing circuits, configured to operate as a plurality of hardware engines; and
a multi-phase memory-mapped queue, coupled to the processing circuit and the plurality of secondary processing circuits, configured to perform message queuing for the processing circuit and the plurality of secondary processing circuits;
wherein:
the controller receives a first host command from the host device, wherein the first host command indicates accessing first data at a first logical address, and the first host command is one of the plurality of host commands; and
in response to the first host command, the controller utilizes the processing circuit to send a first operation command to the NV memory through a control logic circuit of the controller, and trigger a first set of secondary processing circuits among the plurality of secondary processing circuits to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

13. A controller of a memory device, the memory device comprising the controller and a non-volatile (NV) memory, the NV memory comprising at least one NV memory element, the controller comprising:
 a processing circuit, configured to control the controller according to a plurality of host commands from a host device, to allow the host device to access the NV memory through the controller;
 a plurality of secondary processing circuits, configured to operate as a plurality of hardware engines; and
 a multi-phase memory-mapped queue, coupled to the processing circuit and the plurality of secondary processing circuits, configured to perform message queuing for the processing circuit and the plurality of secondary processing circuits;

wherein:
 the controller receives a first host command from the host device, wherein the first host command indicates accessing first data at a first logical address, and the first host command is one of the plurality of host commands; and
 in response to the first host command, the controller utilizes the processing circuit to send a first operation command to the NV memory through a control logic circuit of the controller, and trigger a first set of secondary processing circuits among the plurality of secondary processing circuits to operate and interact via the multi-phase memory-mapped queue, for accessing the first data for the host device, wherein the first operation command carries a first physical address associated with the first logical address, for indicating a storage location within the NV memory, and the processing circuit and the first set of secondary processing circuits share the multi-phase memory-mapped queue, and use the multi-phase memory-mapped queue as multiple chained message queues associated with multiple phases, respectively, for performing message queuing for a chained processing architecture comprising the processing circuit and the first set of secondary processing circuits.

* * * * *